United States Patent
Hamer et al.

(10) Patent No.: US 10,521,626 B2
(45) Date of Patent: Dec. 31, 2019

(54) METHODS AND SYSTEMS FOR OPERATING A MATERIAL HANDLING SYSTEM

(71) Applicant: Intelligrated Headquarters, LLC, Mason, OH (US)

(72) Inventors: John Hamer, Brentwood, MO (US); John Simons, Mason, OH (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 16/239,652

(22) Filed: Jan. 4, 2019

(65) Prior Publication Data

US 2019/0370511 A1    Dec. 5, 2019

Related U.S. Application Data

(63) Continuation of application No. 15/994,407, filed on May 31, 2018, now Pat. No. 10,204,247.

(51) Int. Cl.
| | | |
|---|---|---|
| *G06K 7/10* | (2006.01) | |
| *B65G 47/53* | (2006.01) | |
| *B25J 19/06* | (2006.01) | |
| *B65G 43/08* | (2006.01) | |

(52) U.S. Cl.
CPC .......... *G06K 7/10445* (2013.01); *B25J 19/06* (2013.01); *B65G 43/08* (2013.01); *B65G 47/53* (2013.01); *G05B 2219/40202* (2013.01); *G05B 2219/50358* (2013.01)

(58) Field of Classification Search
CPC .......... G06K 7/10366; G06K 7/10316; G06K 7/10009; G06K 19/0723; G06K 7/10356; G06K 19/0717; G06K 7/0008; G06K 7/10257; G06K 7/10128
USPC ........................................ 340/10.1
See application file for complete search history.

(56) References Cited

U.S. PATENT DOCUMENTS

| | | | | |
|---|---|---|---|---|
| 5,551,833 | A * | 9/1996 | Marsh | B65G 57/06 414/793.4 |
| 7,737,849 | B2 * | 6/2010 | Hwang | E05C 3/043 340/10.1 |
| 7,888,825 | B2 * | 2/2011 | Iida | B25J 19/06 307/326 |
| 7,953,216 | B2 | 5/2011 | Profanchik, Sr. | |

(Continued)

OTHER PUBLICATIONS

U.S. Appl. No. 15/994,407, filed May 31, 2018.

*Primary Examiner* — Mark S Blouin
(74) *Attorney, Agent, or Firm* — Alston & Bird LLP

(57) ABSTRACT

A material handling system comprising one or more sub-systems and one or more sensing panels is provided. Each sensing panel may determine whether a mode control token is within a vicinity of the respective sensing panel. When the mode control token is within the vicinity of the respective sensing panel, the sensing panel may generate a signal, and when the mode is outside of the vicinity of the respective sensing panel, the generation of the signal is halted. The material handling system may further include a processor that enables at least one of the one or more sub-systems of the material handling system in response to the generated signal and disables each of the one or more sub-systems of the material handling system in response to a halting of the generation of the signal.

16 Claims, 11 Drawing Sheets

(56) References Cited

U.S. PATENT DOCUMENTS

2008/0007408 A1   1/2008  Hwang et al.
2009/0072631 A1   3/2009  Iida et al.
2010/0295657 A1   11/2010 Huang
2015/0353293 A1*  12/2015 Richard ............... G05B 19/402
                                                    700/112

* cited by examiner

METHODS AND SYSTEMS FOR OPERATING A MATERIAL HANDLING SYSTEM

CROSS-REFERENCE TO RELATED APPLICATIONS

This application is a continuation of U.S. application Ser. No. 15/994,407, filed May 31, 2018, which application is incorporated by reference herein in its entirety.

TECHNICAL FIELD

The present disclosure relates in general to a material handling system, and more specifically, relates to methods and systems for safely operating a material handling system.

BACKGROUND

In warehouses and other worksites, the loading and unloading of objects such as cartons may require a material handling system that is able to move cartons from one location to another. One such example of a material handling system may include, but is not limited to, a robotic carton unloader. A robotic carton unloader may include one or more sub-systems such as, but not limited to, a robotic arm assembly and a conveyor system. A robotic arm assembly may be adapted to retrieve the carton from a carton pile and place the carton on a conveyor system. Thereafter, the conveyor system may be adapted to convey the carton to another location.

In some instances, some of the sub-systems of a material handling system may operate autonomously without manual intervention, and in other instances, some of the sub-systems of the material handling system may be disabled or carried out manually by a human operator. In these cases, the human operator may operate in tandem with the sub-systems that are enabled in the material handling system to perform a predetermined operation (e.g., moving the cartons from one location to another). Given that autonomous systems are used in conjunction with a human operator, these systems often fail to provide adequate safety measures to prevent injury to the human operator.

BRIEF SUMMARY

In accordance with various embodiments described herein, a material handling system and associate method for operating a material handling system are provided. With reference to the claimed system, the material handling system may include one or more sub-systems for facilitating a movement of materials and one or more sensing panels communicatively coupled with one or more of the sub-systems. Each sensing panel may be configured to determine whether a mode control token is within a vicinity of a respective sensing panel of the one or more sensing panels. In an instance in which the mode control token is determined to be within the vicinity of the respective sensing panel, each sensing panel may be configured to generate a signal. In an instance in which the mode control token is determined to be outside of the vicinity of the respective sensing panel, each sensing panel may be configured to halt generation of the signal. The material handling system may further include a processor communicatively coupled to each of the one or more sensing panels. The processor may be configured to in response to receiving the generated signal, enable at least one of the one or more sub-systems of the material handling system, and in response to the halting of the generated signal, disable each of the one or more sub-systems of the material handling system.

In some embodiments, the one or more sub-systems comprise a plurality of traction devices configured to facilitate traversal of the material handling system, a conveyor system configured to convey one or more cartons, placed on the conveyor system, to a predetermined location, and/or a robotic arm configured to retrieve a carton from a carton pile and place the retrieved carton on the conveyor system.

In such an embodiment, enabling at least one of the one or more sub-systems of the material handling system may include operating the material handling system in one or more modes. The one or more modes may include an automatic mode that enables a robotic arm assembly and a conveyor system, a conveyor mode that enables the conveyor system, and a traversal mode that enables a plurality of traction devices.

In some embodiments, each of the one or more sensing panels may also be configured to receive a beacon signal transmitted by the mode control token, determine a location of the mode control token, and compare the location of the mode control token with one or more location thresholds. Each sensing panel may further, in an instance in which the location satisfies the one or more location thresholds, determine that the mode control token is within the vicinity of at least one of the one or more sensing panels. Each sensing panel may also in an instance in which the location fails to satisfy the one or more location thresholds, determine that the mode control token is outside of the vicinity of each of the one or more sensing panels.

In some further embodiments, the determined location of the mode control token may satisfy the one or more location thresholds in an instance in which the mode control token is in physical contact with at least one of the one or more sensing panels.

In some other embodiments, each of the one or more sensing panels may be further configured to transmit an interrogation signal and determine whether a response to the interrogation signal is received from the mode control token. Each of the sensing panels may, in an instance in which the response of the interrogation signal is received, determine that the mode control token is within the vicinity of the respective sensing panel. Each of the sensing panels may also, in an instance in which the response of the interrogation signal is not received, determine that the mode control token is outside of the vicinity of the respective sensing panel.

In some still further embodiments, each of the one or more sensing panels may also be configured to transmit an interrogation signal, monitor a phase of a backscattered signal received from the mode control token, and compare the phase of the backscattered signal with the a predetermined phase threshold to determine whether the mode control token is within the vicinity of the respective sensing panel.

In some other embodiments, at least one of the one or more sensing panels further includes a retention structure configured to retain the mode control token in the vicinity of the at least one sensing panel.

BRIEF DESCRIPTION OF THE DRAWINGS

The description of the illustrative embodiments may be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
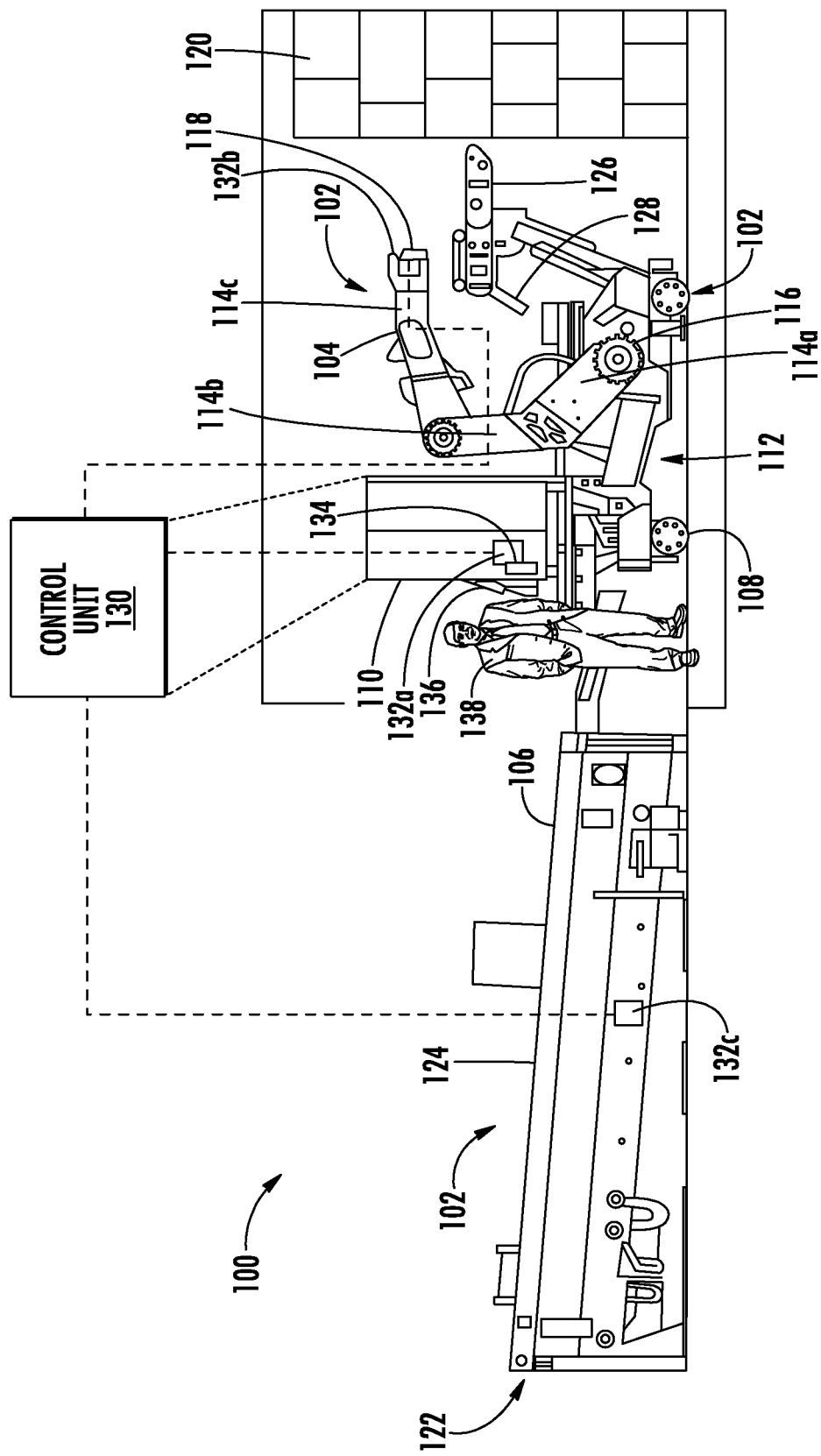
FIG. 1 illustrates an example material handling system, in accordance with one or more embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout. Terminology used in this patent is not meant to be limiting insofar as devices described herein, or portions thereof, may be attached or utilized in other orientations The term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Material handling systems include machines, systems, sub-systems, and the like that are configured to unload cartons (e.g., objects, boxes, etc.) from a location in a worksite and transfer the unloaded cartons to another location in the worksite. According to one or more example embodiments described hereafter, the material handling system of the present application may include one or more sub-systems such as a robotic arm assembly or a conveyor system. For example, the robotic arm assembly is adapted to retrieve a carton from a carton pile and place the retrieved carton on the conveyor system. Thereafter, the conveyor system transports the carton to another location.

Further, the material handling system of the present disclosure includes one or more sensing panels. Each of the one or more sensing panels is adapted to determine whether a mode control token is in a vicinity of the respective sensing panels. If at least one sensing panel of the one or more sensing panels determines that the mode control token is within its vicinity, the at least one sensing panel generates a signal. Thereafter, the at least one sensing panel transmits the generated signal to a processor. Upon receiving the generated signal, the processor may configure the material handling system to operate in a predetermined mode. These modes, for example, may be configured to enable or disable certain sub-systems of the one or more sub-systems in the material handling system.

Further, in an instance when the mode control token is not within the vicinity of the at least one sensing panel, the at least one sensing panel halts the generation of the signal and, accordingly, stops the transmission of the signal to the processor. When the processor stops receiving the signal from any of the one or more sensing panels, the processor halts the operation of the material handling system. In this way, in emergency scenarios, the system of the present disclosure allows an operator to immediately shut down or halt the operation of the material handling system by removing the mode control token from the vicinity of the at least one sensing panel. Furthermore, the systems of the present disclosure removes the need of the operator to find an on/off switch for shutting down the material handling system. Additionally, the embodiments illustrated herein allow the material handling system to operate in multiple modes by simply placing the mode control token in the vicinity of a predetermined sensing panel.

FIG. 1 illustrates an example material handling system 100, in accordance with one or more embodiments of the present disclosure. The material handling system 100 includes one or more sub-systems (e.g., sub-systems 102) that further include a robotic arm assembly 104, a conveyor system 106, and a plurality of traction devices 108. Additionally, the material handling system 100 includes a control system 110 that is adapted to control the operation of the one or more sub-systems 102.

The robotic arm assembly 104 is movably coupled to a frame 112 of the material handling system 100. The robotic arm assembly 104 includes one or more robotic arms 114 movably coupled with one another through one or more joints 116. For example, as depicted in FIG. 1, the one or more robotic arms 114 include a first robotic arm 114a pivotally coupled to the frame 112 of the material handling system 100. Further, the one or more robotic arms 114 include a second robotic arm 114b movably coupled to the first robotic arm 114a, and a third robotic arm 114c movably coupled to the second robotic arm 114b. Additionally, the robotic arm assembly 104 includes a manipulator 118 coupled to the third robotic arm 114c. The manipulator 118 is adapted to retrieve a carton from a carton pile 120. In an example embodiment, the manipulator 118 includes one or more vacuum suctions (not shown) that facilitate retrieving a carton from the carton pile 120. After retrieval of the carton, the one or more robotic arms 114 place the retrieved carton on the conveyor system 106. In an example embodiment, the robotic arm assembly 104 may have a predetermined degree of freedom that is deterministic of a motion of the robotic arm assembly 104. In an example embodiment, the degree of freedom of the robotic arm assembly 104 is defined as a number of achievable independent movements of the robotic arm assembly 104. For example, if the robotic arm assembly 104 has six degrees of freedom, the robotic arm assembly 104 may be adapted to have six independent movements. Some examples of the robotic arm assembly 104 may include, but are not limited to, FANUC® Robot R-1000ia, Kuka robotic arm, ABB robotic arm, and/or RobotWorx robotic arm.

The conveyor system 106 is adapted to transport the carton, placed by the robotic arm assembly 104, to an end 122 of the material handling system 100. The conveyor system 106 includes a plurality of fixed conveyors 124, a lift 126, and a transition belt 128. The lift 126 may be proximal to the robotic arm assembly 104 and may be connected to the plurality of fixed conveyors 124 through the transition belt 128. Further, the lift 126 may be adapted to move in accordance with a change in position of the manipulator 118 of the robotic arm assembly 104. For example, the manipulator 118 of the robotic arm assembly 104 moves from a first position to a second position such that the second position is at a greater height than the first position. In such an embodiment, a height of a lift 126 (with reference to the ground surface on which the material handling system 100 is positioned) is modified in accordance with a change in position of the manipulator 118. In an example embodiment, a change in the position of the lift 126 is proportional to a change in position of the manipulator 118 of the robotic arm 104. In an example embodiment, the lift 124 may be coupled to the frame 112 of the material handling system 100 through a telescopic arm 128 that facilitates modification of the position of the lift 126 according to the position of the robotic arm assembly 104. The robotic arm assembly 104 places the retrieved cartons on the lift 126. Thereafter, the lift transports the placed carton to the plurality of fixed conveyors 124 by the transition belt 128.

Each of the plurality of fixed conveyors 124 may include a conveyor belt (not shown) that may correspond to an endless medium that moves about one or more pulleys to transport the carton to the end 122 of the material handling system 100. In an example embodiment, the conveyor belt may have a predetermined coefficient of friction that does not allow the carton, placed on the conveyor belt, to slip. Some examples of the conveyor belt may include, but are not limited to, a rubber conveyor belt, a metal plate based conveyor belt, and/or the like. As shown in FIG. 1, some embodiments include a cross belt conveyor. In other embodiments, consistent with aspects of the present disclosure, other types of conveyors may be used in conjunction with or as an alternative to the cross belt conveyor.

The plurality of traction devices 108 are coupled to the frame 112 of the material handling system 100. Further, the plurality of traction devices 108 are adapted to facilitate the movement of the material handling system 100. In an example embodiment, the plurality of traction devices 108 may correspond to wheels that engage with the ground surface and allow movement of the material handling system 100. The plurality of traction devices 108 are coupled to a plurality of servomotors (not shown) that provide power to the plurality of traction devices 108 to provide movement. As illustrated in FIG. 1, the plurality of traction devices 108 are wheels; however, in other embodiments, the plurality of traction devices 108 may correspond to other types of the traction devices such as, but not limited to, an endless track based traction device.

The control system 110 may include suitable logic/circuitry that enables the control system 110 to control the operation of the material handling system 100. The control system 110 may include a control unit 130, one or more sensing panels 132a, 132, and 132c, a mode control token 134, and an operator control panel 136. The one or more sensing panels 132a, 132, and 132c are positioned at predetermined locations on the material handling system 100. As illustrated in FIG. 1, the sensing panel 132b is positioned in the manipulator 118 of the robotic arm assembly 104. Further, the sensing panel 132c and the sensing panel 132a are positioned below the conveyor system 106 and on the operator control panel 136, respectively. Further, each of the one or more sensing panels 132a, 132b, and 132c is communicatively coupled to the control unit 130. For the purpose of the present disclosure, the one or more sensing panels 132a, 132b, and 132c are interchangeably referred to as the sensing panel 132.

The control unit 130 may include suitable logic, circuitry, and various interfaces that enable the control unit 130 to control the one or more sub-systems 102 of the material handling system 100. For example, the control unit 130 may include an interface to communicate with the one or more sensing panels 132a, 132b, and 132c. Further, the control unit 130 may include interfaces to communicate with the robotic arm assembly 104, the conveyor system 106, and the plurality of traction devices 108. In an example embodiment, the control unit 130 may be adapted to receive signals from the one or more sensing panels 132a, 132b, and 132c. Further, based on the received signal, the control unit 130 may be adapted to enable or disable sub-systems of the one or more sub-systems 102, as is further described below with reference to FIG. 9. Based on the received signal, for example, the control unit 130 may be adapted to disable the robotic arm assembly 104 and enable the conveyor system 106. Various permutations and combinations of enabling/disabling the one or more sub-systems may correspond to one or more modes of operation of the material handling system 100.

In an example embodiment, the one or more modes may include, but are not limited to, an automatic mode, a conveyor mode, a stop mode, and a traversal mode. In the automatic mode, the robotic arm assembly 104 and the conveyor system 106 of the material handling system 100 are enabled, while the plurality of traction devices 108 is disabled. In the conveyor mode, the robotic arm assembly 104 and the plurality of traction devices 108 are disabled and only the conveyor system 106 is enabled. In the stop mode, the operation of the material handling system 100 is halted (i.e., neither of the robotic arm assembly 104, the conveyor system 106, or the plurality of traction devices 108 are enabled). In the traversal mode, the plurality of traction devices 108 are enabled while the robotic arm assembly 104 and the conveyor system 106 of the material handling system 100 are disabled. The operation of the control unit 130 and various interfaces of the control unit 130 are described hereafter in conjunction with FIG. 2.

The sensing panel 132 includes suitable logic and/or circuitry to enable the sensing panel 132 to determine whether a predetermined token is in a vicinity of the sensing panel 132. For example, the sensing panel 132 may determine whether a mode control token 134 is within its vicinity, as is further described in conjunction with FIG. 2. In an example embodiment, the sensing panel 132 may include an antenna that facilitates detection of the mode control token 134 when the mode control token 134 is in the vicinity of the sensing panel 132, as is described hereafter in conjunction with FIG. 8. In an example embodiment, the vicinity of the sensing panel 132 may be defined as a signal transmission range of the antenna. The signal transmission range may correspond to a maximum distance at which the antenna of the sensing panel 132 can transmit a signal. Additionally or alternatively, the vicinity may be defined by a geo fenced region defined around each of the one or more sensing panels 132a, 132b, and 132c. In some embodiments, the geo fenced region may be defined in accordance to the signal transmission range of the antenna in each of the one or more sensing panels 132a, 132b, and 132c. In alternate embodiments, the geo fenced region may correspond to a set of location coordinates that defines a virtual boundary around each of the one or more sensing panels 132a, 132b, and 132c, such that when the mode control token 134 is within a virtual boundary, the mode control token 134 is determined to be within the vicinity of a sensing panel corresponding to the geo fenced region. Hereinafter, the virtual boundary of the geo fenced region is described with reference to a location threshold.

In an example embodiment, the operator of the material handling system 100 may define the location threshold for each of the one or more sensing panels 132a, 132b, and 132c during initial configuration of the material handling system 100. In an alternative example embodiment, the geographic area covered by each geo fenced region may be different for each of the one or more sensing panels 132a, 132b, and 132c. For instance, the area of the geo fenced region corresponding to the sensing panel 132c may greater than the area of the geo fenced region corresponding to sensing panels 132a and 132b. The sensing panel 132 may be further adapted to retrieve data stored in the mode control token 134, as is further described in FIG. 8. The sensing panel 132 may utilize one or more protocols such as, but are not limited to, Radio Frequency Identification (RFID), Zigbee, Bluetooth™, Infra-Red (IR) based communication, Near Field Communication (NFC), and/or the like to retrieve data from the mode control token 134. In an example embodiment, the sensing panel 132 may be adapted to generate the signal based on the data retrieved from the mode control token 134, as is further described in FIG. 8. The sensing panel 132 may be further adapted to transmit the generated signal to the control unit 130. The structure of the sensing panel 132 is described hereafter in conjunction with FIG. 3. Further, the operation performed by the sensing panel 132 is described hereafter in conjunction with FIG. 8.

As described above, in some embodiments, various elements or components of the circuitry of the sensing panel 132 may be housed within the control unit 130 or vice versa. It will be understood in this regard that some of the components described in connection with the sensing panel 132 and/or control unit 130 may be housed in whole or in part within various devices illustrated in FIG. 1, or by yet another device not expressly illustrated in FIG. 1.

The mode control token 134 may include suitable logic and/or circuitry that enables the mode control token 134 to store data/information. Further, the mode control token 134 may include an antenna that facilitates communication with the sensing panel 132 (e.g., when the mode control token 134 is in the vicinity of the sensing panel 132, as described hereafter in conjunction with FIG. 8). For example, the mode control token 134 may communicate data (e.g., stored by the mode control token 134) with the sensing panel 132. Some examples of the mode control token 134 include, but are not limited to, an RFID tag, a NFC tag, a Bluetooth tag, and/or the like. The structure of the mode control token 134 is described hereafter in conjunction with FIGS. 4-6.

The operator control panel 136 corresponds to a panel that enables an operator 138 of the material handling system 100 to operate/control the operation of the one or more sub-systems 102 of the material handling system 100. For example, the operator control panel 136 may be utilized to control the robotic arm assembly 104. The operator control panel 136 may include one or more input devices (not shown) that may be used by the operator 138 of the material handling system 100 to operate the one or more sub-systems 102.

Figure 2:
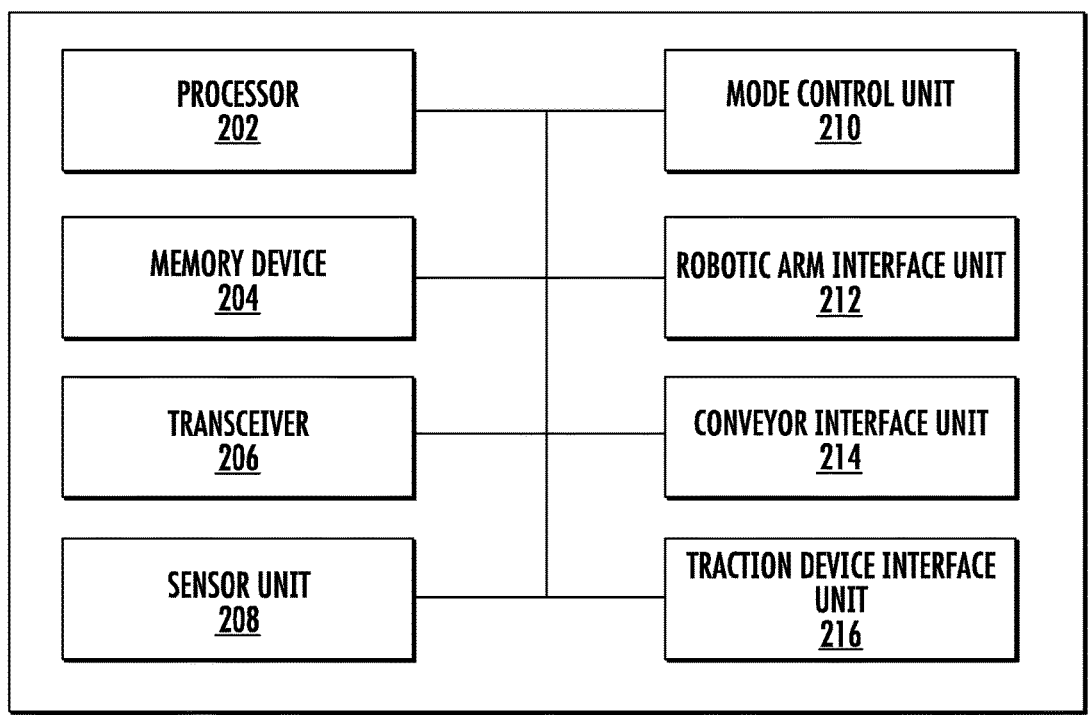
FIG. 2 illustrates a block diagram of a control system for the material handling system of FIG. 1, in accordance with one or more embodiments of the present disclosure.

FIG. 2 illustrates a block diagram of the control unit 130. As shown, the control unit 130 includes a processor 202, a memory device 204, a transceiver 206, a sensor unit 208, a mode control unit 210, a robotic arm interface unit 212, a conveyor interface unit 214, and a traction device interface unit 216.

The processor 202 may be embodied as one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), or some combination thereof.

Accordingly, although illustrated in FIG. 2 as a single processor, in an example embodiment, the processor 202 may include a plurality of processors and signal processing modules. The plurality of processors may be embodied on a single electronic device or may be distributed across a plurality of electronic devices collectively configured to function as the circuitry of the control unit 130. The plurality of processors may be in operative communication with each other and may be collectively configured to perform one or more functionalities of the circuitry of the control unit 130, as described herein. In an example embodiment, the processor 202 may be configured to execute instructions stored in the memory device 204 or otherwise accessible to the processor 202. These instructions, when executed by the processor 202, may cause the circuitry of the control unit 130 to perform one or more of the functionalities, as described herein.

Whether configured by hardware, firmware/software methods, or by a combination thereof, the processor 202 may include an entity capable of performing operations according to embodiments of the present disclosure while configured accordingly. Thus, for example, when the processor 202 is embodied as an ASIC, FPGA, or the like, the processor 202 may include specifically configured hardware for conducting one or more operations described herein. Alternatively, as another example, when the processor 202 is embodied as an executor of instructions, such as may be stored in the memory device 204, the instructions may specifically configure the processor 202 to perform one or more algorithms and operations described herein.

Thus, the processor 202 used herein may refer to a programmable microprocessor, microcomputer, or multiple processor chip(s) that can be configured by software instructions (e.g., applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory can also be located internal to another computing resource (e.g., enabling computer readable instructions to be downloaded over the Internet or another wired or wireless connection).

The memory device 204 may include suitable logic, circuitry, and/or interfaces that are adapted to store a set of instructions that is executable by the processor 202 to perform predetermined operations. Some of the commonly known memory implementations include, but are not limited to, hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, compact disc read only memory (CD-ROM), digital versatile disc read only memory (DVD-ROM), optical disc, circuitry configured to store information, or some combination thereof. In an example embodiment, the memory device 204 may be integrated with the processor 202 on a single chip, without departing from the scope of the disclosure.

The transceiver 206 may correspond to a communication interface that facilitates transmission and reception messages and data to/from various components of the material handling system 100. Examples of the transceiver 206 may include, but are not limited to, an antenna, an Ethernet port, a USB port, a serial port, or any other port that can be adapted to receive and transmit data. The transceiver 206 transmits and receives data/messages in accordance with the various communication protocols, such as, I2C, TCP/IP, UDP, and 2G, 3G, 4G, or 5G communication protocols.

The sensor unit 208 may include suitable logic/circuitry that enables the sensor unit 208 to communicate with the one or more sensing panels 132a, 132b, and 132c. In an example embodiment, the sensor unit 208 may be adapted to communicate with the one or more sensing panels 132a, 132b, and 132c through the transceiver 206. For example, the sensor unit 208 may be adapted to receive the signal from the one or more sensing panels 132a, 132b, and 132c. The sensor unit 208 may be further adapted to transmit a signal reception state of each of the one or more sensing panels 132a, 132b, and 132c to the mode control unit 210, as is further described in conjunction with FIGS. 9-13. In an example embodiment, the signal reception state may be indicative of whether the sensor unit 128 is receiving the signal from the one or more sensing panels 132a, 132b, and 132c. The details pertaining to the signal reception state are hereafter described in conjunction with FIGS. 9-13. The sensor unit 208 may be implemented using one or more technologies such as, but not limited to, FPGA, ASIC, and the like.

The mode control unit 210 may include suitable logic/circuitry that enables the mode control unit 210 to determine a mode of the one or more modes in which to operate the material handling system 100. In an example embodiment, the mode control unit 210 may be adapted to receive the signal reception state from the sensing unit 208. Based on the signal reception state, the mode control unit 210 is adapted to determine the mode of the one or more modes, as is further described in conjunction with FIGS. 9-13. Further, based on the determined mode, the mode control unit 210 may be adapted to send an instruction of the one or more sub-systems 102 of the material handling system 100. In an example embodiment, the instruction may correspond to enabling/disabling the one or more sub-systems 102 of the material handling system 100. For example, the mode control unit 210 may be configured to send the instruction to enable/disable one or more of the robotic arm interface unit 212, the conveyor interface unit 214, and the traction device interface unit 216, as is further described in conjunction with FIGS. 9-13. The mode control unit 210 may be implemented using one or more technologies such as, but not limited to, FPGA, ASIC, and the like.

The robotic arm interface unit 212 may include suitable logic/circuitry that enables the robotic arm interface unit 212 to control the operation of the robotic arm assembly 104. For example, the robotic arm interface unit 212 may be adapted to enable/disable the robotic arm assembly 104. Further, the robotic arm interface unit 212 may operate the robotic arm assembly 104 according to pre-stored instructions that allows the robotic arm assembly 102 to retrieve the carton from the carton pile 120 and place the retrieved carton on the conveyor system 106. In an example embodiment, the pre-stored instructions may define a path traversable by the robotic arm assembly 104 in order to perform the aforementioned operation. The robotic arm interface unit 212 may be implemented using one or more technologies such as, but not limited to, FPGA, ASIC, and the like.

The conveyor interface unit 214 may include suitable logic/circuitry that enables the conveyor interface unit 214 to operate the conveyor system 106. For example, the conveyor interface unit 214 may be adapted to enable/disable the conveyor system 106. Further, the conveyor interface unit 214 may be adapted to operate the conveyor system 106 according to the mode of the one or more modes determined by the mode control unit 210. The operation of the conveyor interface unit 214 according to the one or more modes has been described hereafter with reference to FIG. 9-13. The conveyor interface unit 214 may be implemented using one or more technologies such as, but not limited to, FPGA, ASIC, and the like.

The traction device interface unit 216 may include suitable logic/circuitry that enables the traction device interface unit 216 to control the operation of the plurality of traction devices 108. For example, the traction device interface unit 216 may be adapted to enable/disable the plurality of traction devices 108. Further, the traction device interface unit 216 may be adapted to control the servomotors coupled to the plurality of traction devices 108 in order to move the material handling system 100. The traction device interface unit 216 may be implemented using one or more technologies such as, but not limited to, FPGA, ASIC, and the like.

In an example embodiment, the processor 202 may be adapted to control and monitor the operation of the memory device 204, the transceiver 206, the sensor unit 208, the mode control unit 210, the robotic arm interface unit 212, the conveyor interface unit 214, and the traction device interface unit 216. For example, in operation, the processor 202 may be adapted to transmit an instruction to the sensor unit 208 to check if the mode control token 134 is within the vicinity of one of the one or more sensing panels 132a, 132b, and 132c.

Upon receiving the instruction from the processor 202, the sensor unit 208 causes each of the one or more sensing panels 132a, 132b, and 132c to transmit an interrogation signal. In an example embodiment, the interrogation signal may correspond to a signal that may be utilized to determine whether the mode control token 134 is within the vicinity of the respective sensing panels 132a, 132b, and 132c. If the mode control token 134 is within the vicinity of a sensing panel of the one or more sensing panels 132a, 132b, and 132c, the mode control token 134 may be adapted to respond to the interrogation signal. Therefore, the one or more sensing panels 132a, 132b, and 132c may determine whether the mode control token 134 is within the vicinity by checking if the response to the interrogation signal is received.

In an alternate embodiment, the one or more sensing panels 132a, 132b, and 132c may determine whether the mode control token 134 is within the vicinity by monitoring a phase of a back scattered signal received from the mode control token 134. In an example embodiment, the backscattered signal may correspond to a reflection of the interrogation signal transmitted by the sensing panel 132. When the mode control token 134 is within the vicinity of the sensing panel 132, the mode control token 134 may receive the interrogation signal from the sensing panel 132. Usually a portion of the received interrogation signal reflects from the mode control token 134. Such reflected interrogation signal is referred to as the back scattered signal. In an example embodiment, the sensing panel 132 may compare the phase of the back scattered signal with a predetermined phase threshold to determine whether the mode control token 134 is within the vicinity of the sensing panel 132. In an example embodiment, the predetermined phase threshold may correspond to a value of the phase of the backscattered signal such that if the phase of the received back scattered signal is more than the predetermined phase threshold, the sensing panel 132 may determine that the mode control token 134 is within its vicinity. However, if the sensing panel 132 determines that the phase of the received backscattered signal is less than the predetermined phase threshold, the sensing panel 132 may determine that the mode control token 134 is not within its vicinity (e.g., outside of its vicinity).

In an alternate embodiment, the one or more sensing panels 132a, 132b, and 132c may be configured to receive a beacon signal from the mode control token 134. In such an embodiment, each of the one or more sensing panels 132a, 132b, and 132c may be configured to determine a location of the mode control token 134 based on analysis a signal strength of the beacon signal received from the mode control token 134. In an example embodiment, the one or more sensing panels 132a, 132b, and 132c may employ triangulation techniques to determine the location of the mode control token 134 based upon the signal strength of the beacon signal received from the mode control token 134. Thereafter, each of the one or more sensing panels 132a, 132b, and 132c may be configured to compare the determined location of the mode control token 134 with respective location thresholds to determine whether the mode control token 134 is within a respective vicinity. As described above, the location threshold corresponds to the set of location coordinates that define the geo fence boundary around each of the one or more sensing panels 132a, 132b, and 132c. In an example embodiment, if a sensing panel of the one or more sensing panels 132a, 132b, and 132c determines that the determined location of the mode control token 134 is within the location threshold associated with the sensing panel (e.g., the sensing panel 132a), the sensing panel 132a may determine that the mode control token 134 is within the vicinity. However, if each of the one or more sensing panels 132a, 132b, and 132c determines that the location of the mode control token 134 is not within the respective location threshold, then each of the one or more sensing panels 132a, 132b, and 132c determines that the mode control token 134 is outside of their respective vicinities.

On determining that the mode control token 134 is within the vicinity of the sensing panel 132a, the sensing panel 132a initiates an interrogation sequence with the mode control token 134 to retrieve the information stored in the mode control token 134. In an example embodiment, the information may include a unique ID that identifies the mode control token 134. In some embodiments, the unique ID may be associated with the operator of the material handling system 100. The sensing panel 132a may be adapted to transmit the information retrieved from the mode control token 134 to the sensor unit 208. The sensor unit 208 may be adapted to authenticate the mode control token 134 based on the unique ID retrieved from the mode control token 134. In an example embodiment, the sensor unit 208 may be adapted to compare the unique ID with a set of predetermined IDs (e.g., stored in the memory device 204) to authenticate the mode control token 134. In an example embodiment, the set of predetermined IDs may correspond to a list of IDs of mode control tokens that are authorized to be used with the material handling system 100. If the sensor unit 208 determines that the unique ID of the mode control token 134 is present in the set of predetermined IDs, the sensor unit 208 may determine that the mode control token 134 is authorized to operate with the material handling system 100. If the sensor unit 208 determines that the unique ID of the mode control token 134 is not present in the set of predetermined IDs, however, the sensor unit 208 may disregard the mode control token 134 may not perform any further steps of the method described herein.

In some embodiments in which the unique ID (retrieved from the mode control token 134) identifies the operator of the material handling system 100, the sensor unit 208 may be configured to compare the unique ID with the set of predetermined IDs, which corresponds to the IDs of the operators that are authorized to operate the material handling system 100. If the sensor unit 208 determines that the unique ID of the operator is present in the set of predetermined IDs, the sensor unit 208 may determine that the operator associated with the unique ID (retrieved from the mode control token 134) is authorized to operate the material handling system 100. However, if the sensor unit 208 determines that the unique ID of the operator (retrieved from the mode control token 134) is not present in the set of predetermined IDs, the sensor unit 208 may determine that the operator associated with unique ID is not authorized to operate with the material handling system 100. Therefore, the sensor unit 208 may not perform any further steps.

In some embodiments, the information stored in the mode control token 134 may include a first unique ID and a second unique ID. In an example embodiment, the first unique ID may identify the mode control token 134 and the second unique ID may identify the operator associated with the mode control token 134. Further, in such an embodiment, the sensor unit 208 may be configured to compare the first unique ID and the second unique ID with a set of first predetermined IDs and a set of second predetermined IDs, respectively. In an example embodiment, the set of first predetermined IDs corresponds to the list of IDs of the mode control tokens that are authorized to operate with the material handling system 100. Further, the set of second predetermined IDs corresponds to the list of IDs of the operators that are authorized to operate the material handling system 100. For authorization purpose, the sensor unit 208 may be configured to determine whether the first unique ID is present in the set of first predetermined IDs and whether the second unique ID is present in the set of second predetermined IDs, based on the comparison. Thereafter, the sensor unit 208 authorizes the mode control token 208 in an instance when the first unique ID is present in the set of first predetermined IDs and the second unique ID is present in the set of second predetermined IDs.

Such authentication of the mode control token 134 and/or the operator allows only specific mode control tokens and/or operator to operate the material handling system 100, and thus minimizes the misuse of the material handling system 100. In some embodiments, the sensing panel 132a may be adapted to authenticate the mode control token 134. In such embodiment, the sensor unit 208 may be implemented in the sensing panel 132a without departing from the scope of the disclosure.

In response to the successful authentication of the mode control token 134, the sensing panel 132a may generate and transmit the signal to the sensor unit 208. The sensor unit 208 may be adapted to monitor the signal reception state for each of the one or more sensing panels 132a, 132b, and 132c. In an example embodiment, the signal reception state is indicative of whether the signal is received from the one or more sensing panels 132a, 132b, and 132c. In an example embodiment, the signal reception state for each of the one or more sensing panels 132a, 132b, and 132c may have two states (i.e., "no signal" and "signal received"). Further, when the sensor unit 208 receives the signal from one of the one or more sensing panels 132a, 132b, and 132c, the sensor unit 208 may be adapted to identify a sensing panel of the one or more sensing panels 132a, 132b, and 132c from which the signal is received. In an example embodiment, the sensor unit 208 may be adapted to monitor the ports on which the one or more sensing panels 132a, 132b, and 132c are communicatively coupled. Each of the one or more sensing panels 132a, 132b, and 132c are coupled to the independent ports. Therefore, when the signal is received by the sensor unit 208, the sensor unit 208 is adapted to determine to which port the signal is received. Thereafter, the sensor unit 208 is adapted to correlate the determined port with a sensing panel of the one or more sensing panels 132a 132b, and 132c to identify which sensing panel has transmitted the signal. Accordingly, the sensor unit 208 may be adapted to modify the signal reception state for the identified sensing panel. For example, in such an embodiment, when the sensing panel 132a transmits the signal to the sensor unit 208, the signal reception state for the sensing panel 132a changes from "no signal" to "signal received". In an event of state change, the sensor unit 208 may be adapted to transmit an information pertaining to the signal reception state for each of the one or more sensing panels 132a, 132b, and 132c to the mode control unit 210.

The mode control unit 210, on receiving the signal reception state, is adapted to identify the mode of the one or more modes in which the material handling system 100 is to be operated, based on the received signal reception state associated with each of the one or more sensing panels 132a, 132b, and 132c. In an example embodiment, the mode control unit 210 may utilize a look-up table to determine the mode of the one or more modes. Table 1 illustrates an example look-up table that the mode control unit 210 may utilize to determine the mode of operation of the material handling system 100.

TABLE 1

Look-up table illustrating the one or more modes and corresponding signal reception states associated with each of the one or more sensing panels 132a, 132b, and 132c.

| Signal reception state of sensing panel 132a | Signal reception state of the sensing panel 132b | Signal reception state of the sensing panel 132c | Mode |
|---|---|---|---|
| signal received | no signal | no signal | Automatic mode |
| no signal | signal received | no signal | Conveyor mode |
| no signal | no signal | signal received | Traversal mode |
| no signal | no signal | no signal | Stop mode |

For example, the mode control unit 210 determines that the signal reception state of the sensing panel 132a is "signal received", and hence the mode control unit 210 determines that the mode as the automatic mode. Similarly, if the mode control unit 208 determines that the signal reception state of the sensing panel 132b is "signal received", the mode control unit 210 may be adapted to determine the mode as the conveyor mode. Further, if the mode control unit 208 determines that the signal reception state of the sensing panel 132c is "signal received", the mode control unit 210 may be adapted to determine the mode as the traversal mode. Still further, if the mode control token 210 determines that the signal reception state associated with each of the one or more sensing panel 132a, 132b, and 132c is "no signal", the mode control unit 210 may be configured to determine the mode of operation of the material handling system 100 as the "stop mode".

After determining the mode of operation of the material handling system 100, the mode control unit 210 may cause enabling/disabling of the one or more sub-systems 102 of the material handling system 100. For example, the mode control unit 210 may cause enabling/disabling of one or more of the robotic arm interface unit 212, the conveyor interface unit 214, and the traction device interface unit 216 based on the determined mode of operation of the material handling system 100. In an example embodiment, the mode control unit 210 may utilize another look-up table to determine which subsystem of the one or more sub-systems 102 is to be enabled or disabled based on the determined mode.

TABLE 2

Look-up table illustrating the one or more modes and enabling/disabling of the one or more sub-systems 102.

| Mode | Robotic arm assembly 104 | Conveyor system 106 | Plurality of traction devices 108 |
|---|---|---|---|
| Automatic mode | Enabled | Enabled | Disabled |
| Conveyor mode | Disabled | Enabled | Disabled |
| Traversal mode | Disabled | Disabled | Enabled |
| Stop mode | Disabled | Disabled | Disabled |

For example, if the mode control unit 210 determines that the material handling system 100 is to be operated in the automatic mode, the mode control unit 210 may be adapted to transmit instructions to the robotic arm interface unit 212, and the conveyor interface unit 214 to enable the robotic arm assembly 104 and the conveyor system 106. Further, the mode control unit 210 is adapted to transmit instructions to the traction device interface unit 216 to disable the plurality of traction devices 108. Similarly, if the mode control unit 210 determines that the material handling system 100 is to be operated in the conveyor mode, the mode control unit 210 may be adapted to transmit the instruction to the conveyor interface unit 214 to enable the conveyor system 106. Further, the mode control token 210 is adapted to transmit the instructions to the traction device interface unit 216 and the robotic arm interface unit 212 to disable the plurality of traction devices 108 and the robotic arm assembly 104, respectively. While description herein is provided to only the modes of operation of the material handling system 100 listed in Table 2, the present disclosure contemplates that any number of modes utilizing various sensing panels may also be used.

The enabling/disabling of the robotic arm assembly 104, the conveyor system 106, and the plurality of traction devices 108 is performed using a switching element (not shown). The switching element may be adapted to receive an instruction from a respective interface unit (e.g., the robotic arm interface unit 212, the conveyor interface unit 214, and the traction device interface unit 216) and, based on the instruction, the switching element may enable/disable the one or more of the robotic arm assembly 104, the conveyor system 106, and the plurality of traction devices 108. For example, the switching element may be adapted to enable/disable the robotic arm assembly 104 based on the instruction received from the robotic arm interface unit 212. Some examples of the switching element may include, but are not limited to, a relay, a driver circuit, a dual channel circuit breaker, and/or the like.

In another example embodiment, the sensing panel 132a, the sensing panel 132b, and the sensing panel 132c may transmit the signal directly to the switching element. In such an embodiment, the switching element is programmed in such a manner that when the switching element receives the signal from the sensing panel 132a, the switching element enables the robotic arm assembly 104, and the conveyor system 106. Therefore, the material handling system 100 operates in the automatic mode. Similarly, when the switching element receives the signal from the sensing panel 132b, the switching element enables the conveyor system 106 and disables the robotic arm assembly 104 and the plurality of traction devices 108. Therefore, the material handling system 100 operates in the conveyor mode.

In some example embodiments, the mode control unit 210 continues to operate the material handling system 100 in one of the one or more modes only while the mode control token 134 is within the vicinity of one of the one or more sensing panels 132a, 132b, and 132c. For example, the mode control unit 210 continues to operate the material handling system 100 in the automatic mode while the mode control token 134 is vicinity of the sensing panel 132a. The sensing panel 132a is adapted to, periodically, determine whether the mode control token 134 continues to be within the vicinity by periodically transmitting the interrogation signal to the mode control token 134. If the sensing panel 132a fails to receive a response to the interrogation signal, the sensing panel 132a determines that the mode control token 134 is not within the vicinity. Additionally or alternately, the sensing panel 132a may analyze a phase of the backscattered signal received from the mode control token 134 to determine whether the mode control token 134 is within the vicinity of the sensing panel 132a.

On detecting that the mode control token 134 is not within the vicinity of the sensing panel 132a, the sensing panel 132a may be adapted to stop the transmission of the signal to the sensor unit 208. The sensor unit 208, accordingly, modifies the signal reception state for the sensing panel 132a to "no signal". Further, the sensor unit 208 may be adapted to transmit the signal reception state for each of the one or more sensing panels 132a, 132b, and 132c to the mode control unit 210, in an event of change in the signal reception state of at least one of the one or more sensing panels 132a, 132b, and 132c.

The mode control unit 210, on receiving the updated signal reception state associated with each of the one or more sensing panels 132a, 132b, and 132c, is adapted to modify the mode of operation of the material handling system 100. For example, the mode control unit 210 receives "no signal" signal reception state for each of the one or more sensing panels 132a, 132b, and 132c, from the sensing unit 208, the mode control unit 210 determines the mode (of operating the material handling system 100) as the stop mode. Accordingly, the mode control panel 210 may be adapted to transmit the one or more instructions to the robotic arm interface unit 212, the conveyor interface unit 214, and the traction device interface unit 216 to disable the robotic arm assembly 104, the conveyor system 106, and the plurality of traction devices 108, respectively. Therefore, the operation of the material handling system 100 is halted.

Such a mode (i.e., a stop mode) enables the operator to immediately halt the operation of the material handling system 100 (i.e., in case of emergency scenarios). For example, the robotic arm assembly 104 may malfunction such that a mishandling of the article 102 occurs. Therefore, in such a scenario, the operator may want to halt the operation of the material handling system 100. Further, to halt the operation of the material handling system 100, the operator may remove the mode control token 134 from the vicinity of the sensing panel 132a, 132b, or 132c.

Various modes of the operation of the material handling system 100 have been described hereafter in conjunction with various example methods illustrated in FIGS. 10, 11, 12, and 13.

In some embodiments, the one or more sensing panels 132a, 132b, and 132c may be adapted to generate the signal when the mode control token 134 is not within the vicinity of the respective sensing panel. Further, the one or more sensing panels 132a, 132b, and 132c may be adapted to halt the generation of the signal when the mode control token 134 is within the vicinity of the respective sensing panels. In such a scenario, to operate the material handling system 100 in the automatic mode, the mode control token 134 is placed within the vicinity of the sensing panel 132a. Placing the mode control token 134 within the vicinity of the sensing panel 132a causes the sensing panel 132a to halt the generation of the signal, while the sensing panels 132b and 132c continue generation of the signal. This change in the signal reception state of the signal by the sensing panel 132a is detected by the sensor unit 208. Further, the sensor unit 208 transmits the signal reception state to the mode control unit 210. The mode control unit 210 may utilize the following look-up table (in the current scenario) to determine the mode of the one or modes in which the material handling system 100 is to be operated.

TABLE 3

Look up table for the scenario, where the sensing panels 132 do not generate the signal when the mode control token 134 is within the vicinity.

| Signal reception state of sensing panel 132a | Signal reception state of sensing panel 132b | Signal reception state of sensing panel 132c | Mode |
|---|---|---|---|
| no signal | signal received | signal received | Automatic mode |
| signal received | no signal | signal received | Conveyor mode |
| signal received | signal received | no signal | Traversal mode |
| signal received | signal received | signal received | Stop mode |

Thereafter, the mode control unit 210 may be adapted to operate in a similar manner as described above.

In some example scenarios, the scope of the disclosure is not limited to operating the material handling system 100 in the stop mode only when no signal is received from each of the sensing panels 132a, 132b, and 132c. In alternate embodiment, the control unit 210 may be configured to operate the material handling system 100 in the stop mode when the signal is received from two or more sensing panels, simultaneously. For example, the operator 138 may bring the mode control token 134 in vicinity of the sensing panel 132a causing the sensing panel 132a to generate the signal. Concurrently or simultaneously, another operator brings another mode control token 134 in vicinity of the sensing panel 132b causing the sensing panel 132b to generate the signal. Accordingly, the control unit 210 receives signal from both the first sensing panel 132a and the second sensing panel 132b. In such scenario, the control unit 210 may operate the material handling system 100 in the stop mode. Therefore, the control unit 210 disables each of the conveyor system 106, the plurality traction devices 108, and the robotic arm assembly 104. Such operation of the control unit 210 prevents accidental situations, when multiple operators try to operate the material handling system 100 simultaneously.

A person having ordinary skills in the art would further appreciate that the scope of the disclosure is not limited to having multiple sensing panels 132a, 132b, and 132c. In an example embodiment, the control system 110 may include single sensing panel 132 and multiple mode control tokens 134. In an example embodiment, each mode control token 134 may have the information pertaining to a mode of the one or more modes. For example, in such a scenario, a mode control token of the multiple mode control tokens 134 may include information indicative of the automatic mode of operation of the material handling system 100. Similarly, the multiple mode control tokens 134 may include a mode control token that includes information indicative of the conveyor mode of operation of the material handling system 100.

When the mode control token 134 (adapted for the automatic mode) is brought within the vicinity of the sensing panel 132, a first signal is generated. In an example embodiment, the first signal is indicative of the automatic mode operation of the material handling system 100. When the sensor unit 208 receive the first signal, the sensor unit 208 may transmit the information pertaining to the signal reception state to the mode control unit 210. In an example embodiment, the signal reception state in such scenario would be "First signal". The mode control unit 210, on receiving the signal reception state as the "First signal", may operate the material handling system 100 in the automatic mode. Similarly, when the mode control token 134 (adapted for the conveyor mode) is brought within the vicinity of the sensing panel 132, a second signal indicative of the conveyor mode is generated. Further, when no mode control token 134 is within the vicinity of the sensing panel 132, the sensing panel 132 does not generate a signal. When the sensor unit 208 detects that no signal is received from the sensing panel 132, the sensor unit 208 transmits the signal reception state as "no signal" to the mode control unit 210. Accordingly, the mode control unit 210 may be adapted to operate the material handling system 100 in the stop mode.

Figure 3:
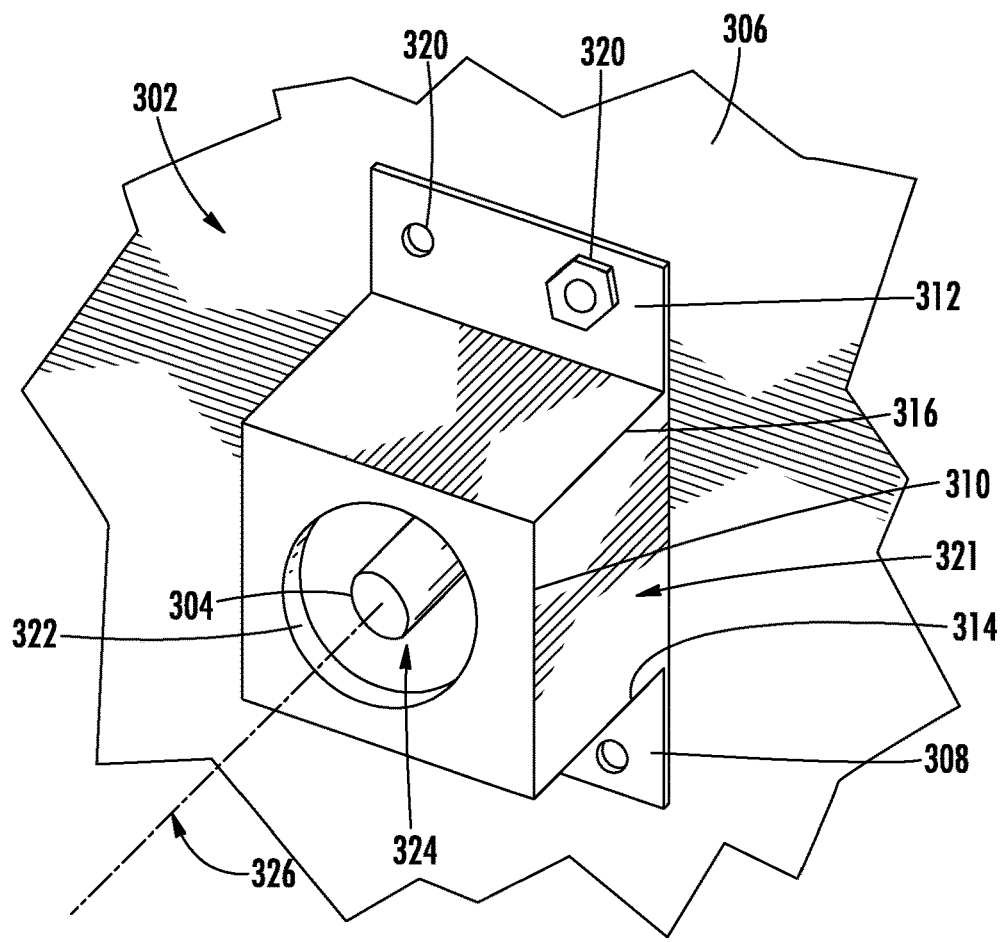
FIG. 3 illustrates a perspective view of a sensing panel, in accordance with one or more embodiments of the present disclosure.

FIG. 3 illustrates a perspective view of the sensing panel 132, according to one or more embodiments. The structure of the sensing panel 132 has been described in conjunction with FIG. 1 and FIG. 2. The sensing panel 132 includes a bracket 302, and a Radio Frequency (RF) reader 304. The bracket 302 and the RF reader 304 are coupled to a housing 306 of the material handling system 100. In an example embodiment, the structure of the sensing panel 132 described herein is applicable on the one or more sensing panels 132a, 132b, and 132c.

The bracket 302 corresponds to a U-shaped bracket that includes a first plate 308, a second plate 310, and a third plate 312. The second plate 310 is parallel to the first plate 308 and the third plate 312. Further, the first plate 308 and the third plate 312 are in a same plane. In an example embodiment, the bracket 302 further includes a first extension 314 and a second extension 316. The first extension 314 couples the first plate 308 with the second plate 310. Further, the second extension 316 couples the third plate 312 with the second plate 310. The first extension 314 is perpendicular to the first plate 308 and the second plate 310. Similarly, the second extension 316 is perpendicular to the third plate 312 and the second plate 310.

In an example embodiment, the first plate 308 and the third plate 312 include one or more through holes 318. The one or more through holes 318 are adapted to receive one or more bolts 320 that are adapted to attach the bracket 302 to the housing 306. In an example embodiment, when the first plate 308 and the third plate 312 are attached to the housing 306, a space 321 is defined between a surface of the housing 306 and the second plate 310. The second plate 310 includes a through hole 322. In an example embodiment, the first plate 308, the second plate 310, and the third plate 312 are formed of a ferromagnetic material such as, but not limited to, iron, nickel, and cobalt. In an example embodiment, the bracket 302 corresponds to the retention structure of the sensing panel 132. In an example embodiment, the bracket 302 enables the retention of the mode control token 134.

The RF reader 304 is attached to the housing 306 of the material handling system 100 in such a manner that a portion 324 of the RF reader 304 extends in the space 321 (defined between the housing 306 and the second plate 310 of the bracket 302). The portion 324 of the RF reader 304 is so positioned in the space 321 such that an axis 326, passing through the RF reader 304, is perpendicular to the plane of the second plate 310. Further, the axis 326 passes through a center of the through hole 322.

In an example embodiment, the RF reader 304 is adapted to detect the mode control token 134 and, accordingly, retrieve data from the mode control token 134. The RF reader 304 may employ one or more protocols such as, but are not limited to, Radio Frequency Identification (RFID), Zigbee, BluetootW', Infra-Red (IR) based communication, Near Field Communication (NFC), and/or the like to retrieve data from the mode control token 134. Further, the RF reader 304 is adapted to generate the signal based on the retrieved data. Furthermore, the RF reader 304 is adapted to transmit the signal to the sensor unit 208. For the purpose of ongoing description, RF reader 304 is considered to be an RFID reader, however, other types of RF reader 304 (such as NFC tag reader, Zigbee based reader, etc.) may equally be contemplated.

Figure 4:
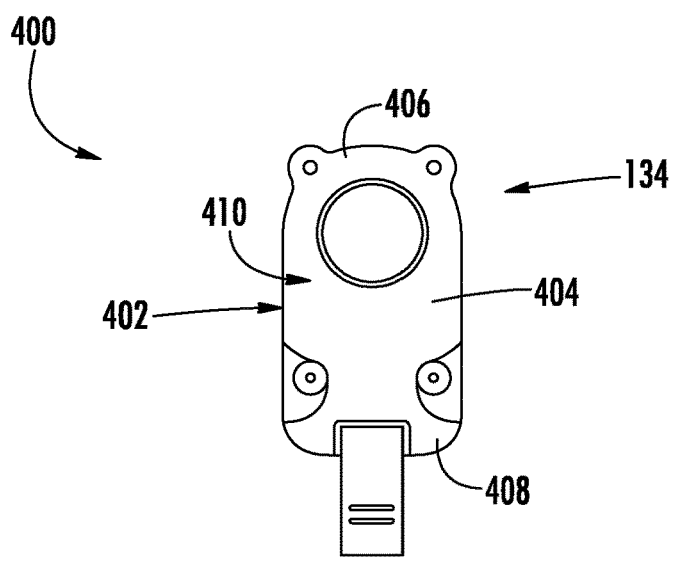
FIG. 4 illustrates a front view of a mode control token, in accordance with one or more embodiments of the present disclosure.
Figure 5:
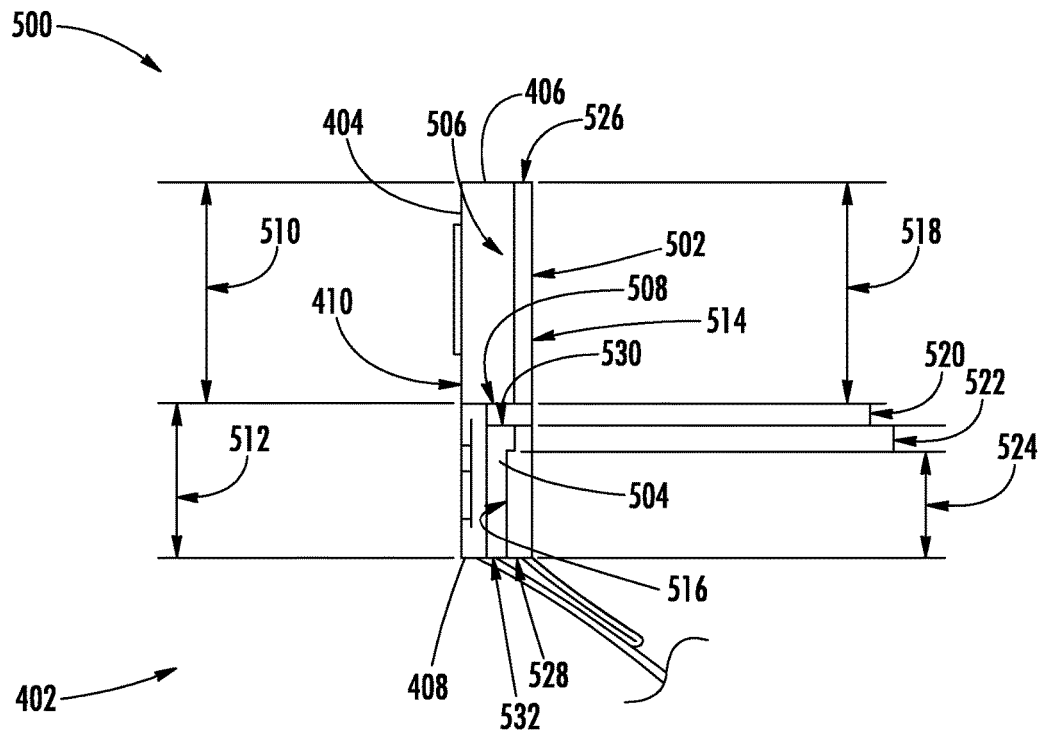
FIG. 5 illustrates a side view of the mode control token, in accordance with one or more embodiments of the present disclosure.
Figure 6:
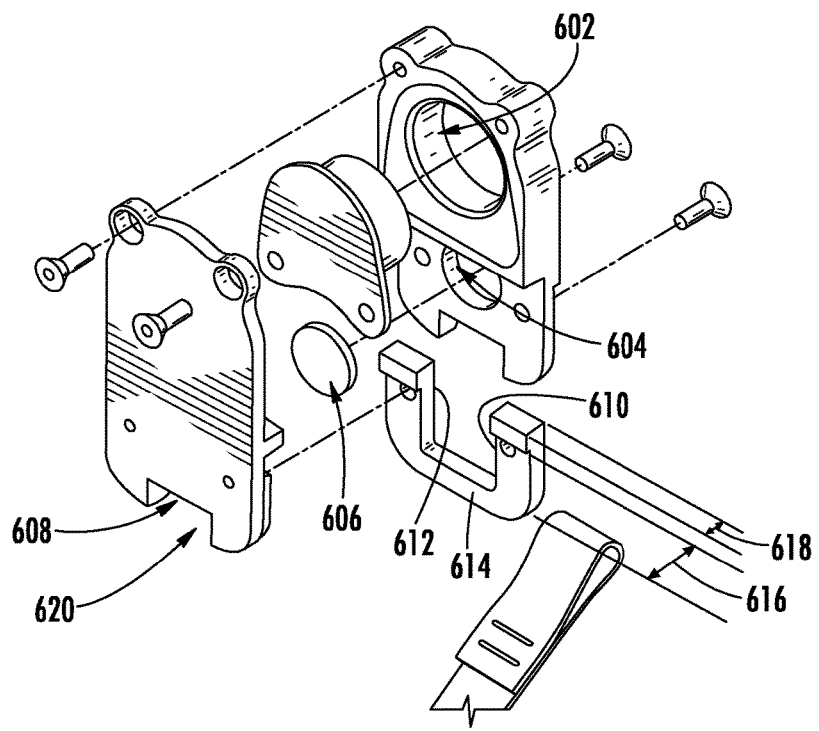
FIG. 6 illustrates an exploded view of the mode control token, in accordance with one or more embodiments of the present disclosure.

The structure of the mode control token 134 will described in conjunction with FIGS. 4-6, in accordance with one or more embodiments.

Referring to FIGS. 4, 5, and 6, a front view 400, a side view 500, and an exploded view 600 of the mode control token 134 are illustrated, respectively. The mode control token 134 includes a housing 402 that includes a front panel 404, a back panel 502, and an insert 504.

The front panel 404 has a first end 406 and a second end 408. Further, the front panel 404 has an outer surface 410 and an inner surface 506. As the inner surface 506 extends between the first end 406 and the second end 408 of the front panel 404, the inner surface 506 defines a step 508 thereby dividing the front panel 404 into a first portion 510 and a second portion 512. In an example embodiment, the first portion 510 extends between the first end 406 of the front panel 404 and the step 508. The second portion 512 extends between the step 508 and the second end 408 of the front panel 404. In an example embodiment, a width of the first portion 510 is greater than a width of the second portion 512.

The outer surface 410 of the front panel 404 defines a cavity 602 in the first portion 510 of the front panel 404. The cavity 602 extends from the outer surface 410 of the front panel 404 to the inner surface 506 of the front panel 404. Further, the cavity 602 is adapted to receive a tag 414. In an example embodiment, the tag 414 includes the information that is read by the RF reader 304, when the mode control token 134 is within the vicinity of the RF reader 304.

The inner surface 506 of the front panel 404 defines a recess 604 in the second portion 512 of the front panel 404. The recess 604 is adapted to receive a magnet 606. Additionally, at the second end 408 of the front panel 404 a slot 416 is defined.

Referring to FIGS. 5 and 6, the back panel 502 of the housing 402 includes an outer surface 514 and an inner surface 516. The inner surface 516 of the back panel 502 defines a first portion 518, a flange portion 520, a groove portion 522, and a second portion 524. The back panel 502 further includes a first end 526 and a second end 528. In an example embodiment, the first portion 518 of the back panel 502 extends from the first end 526 to the flange portion 520. The flange portion 520 extends between the first portion 518 of the back panel 502 and the groove portion 522. The groove portion 522 extends between the flange portion 520 and the second portion 524 of the back panel 502. The second portion 524 of the back panel 502 extends between the groove portion 522 and the second end 528 of the back panel 502. Further, in the second portion of the back panel 502 defines a slot 608 at the second end 528 of the back panel 502. In an example embodiment, the width of the first portion 518 of the back panel 502 is less than a width of the flange portion 520 and the second portion 524 of the back panel 502. In an example embodiment, the width of the first portion 518 is substantially the same as the width of the groove portion 522. Further, the width of the flange portion 520 is greater than the width of the second portion 524 of the back panel 502.

The insert 504 is a substantially U-shaped insert that defines a pair of arms 610 and 612 that extends from a base 614. Further, the insert includes a first end 530 and a second end 532. The base 614 extends between the second end 532 and the pair of arms 610 and 612. Further, the pair of arms 610 and 612 extends between the base 614 and the first end 530. In an example embodiment, each of the pair of arms 610 and 612 includes a first portion 616 and a second portion 618. The first portion 616 of the pair of arms 610 and 610 extends between the second portion 618 of the pair of arms 610 and 612 and the base 614 of the insert 504. Further, the second portion 618 of the pair of arms 610 and 612 extends between the first portion 614 of the pair of arms 610 and 612 and the first end 530. Further, a width of the second portion 616 of the pair of arms 610 and 612 is greater than a width of the first portion 614 of the pair of arms 610 and 612.

The second portion 616 of the pair of arms 610 and 612 is adapted to be received in the groove portion 522 of the back panel 502. Further, the flange portion 520 of the back panel 502 is adapted to abut the step 508 of the front panel 404 such that the slot 416 (defined at the second end 408 of the front panel 404) and the slot 608 (defined at the second end 528 of the back panel 502) aligns with each other. Additionally, the base 614 of the insert 504 also aligns with the slot 608 and the slot 416 such that a channel 620 is defined by the slot 608, the slot 416 and the base 614 of the insert 504. The channel 620 is adapted to receive a strap 418.

The magnet 606 in the mode control token 134 facilitates retention of the mode control token 134 on the bracket 302. Further, the mode control token 134 is retained on the bracket 302 such that the tag 414 aligns with the RF reader 304 in the sensing panel 132. A person having ordinary skills in the art would appreciate that the scope of the disclosure is not limited to having the magnet 606 placed in the housing 402 of the mode control token 134. In an example embodiment, the tag 414 may itself correspond to a magnetically mode control token (i.e., the tag 414 may have magnetic properties that enables the mode control token 134 to be removably attached to the sensing panel 132). In an example embodiment, the magnet 606 allows the mode control token 134 to be attached to the bracket 302 of the sensing panel 132.

In an example embodiment, when the mode control token 134 is not in use, (i.e., the mode control token 134 is not attached to any of the one or more sensing panels 132a, 132b, and 132c) the mode control token 134 may be placed on a holder (not shown) on the material handling system 100.

Figure 7:
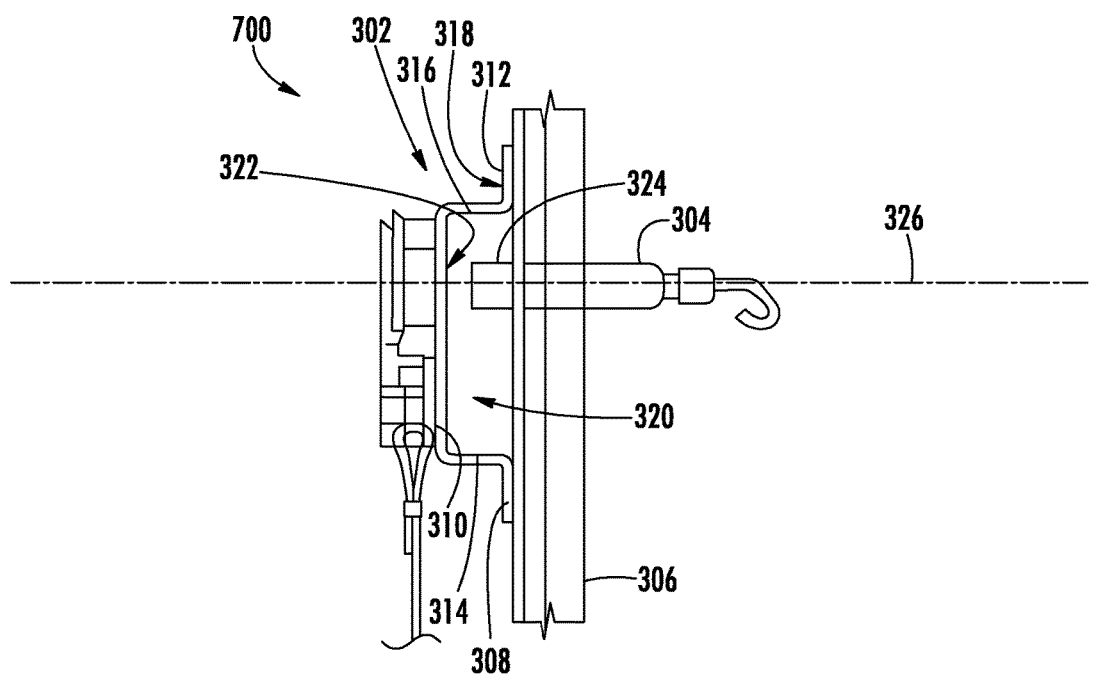
FIG. 7 illustrates a side view of the mode control token attached to the sensing panel, in accordance with one or more embodiments of the present disclosure.

FIG. 7 illustrates a side view 700 of the mode control token 134 attached to the sensing panel 132, in accordance with one or more embodiments. FIG. 7 is described in conjunction with FIG. 3 through FIG. 6.

From FIG. 7, it can be observed that the mode control token 134 is retained on the bracket 302 by means of the magnet 606. In an example embodiment, the mode control token 134 is retained on the bracket 302 such that the tag 414 aligns with the through hole 322, thereby exposing the tag to the space 321. Further, it can be observed from FIG. 7 that the through hole 322 is aligned with the RF reader 304 and the tag 414 of the mode control token 134 (retained on the bracket 302) aligns with the through hole 322, therefore, the tag 414 of the mode control token 134 aligns with the RF reader 304.

As the tag 414 of the mode control token 134 aligns with the RF reader 304, the RF reader 304 is able to read to the contents of the tag 414. Further, so long as the mode control token 134 is attached to the bracket 502, the RF reader 304 is able to read the tag 414. As soon as the tag 414 misaligns with the RF reader 304 (e.g., when the mode control token 134 is detached from the bracket 402), the RF reader 304 is unable to read the tag 414. Accordingly, the RF reader 304 halts the generation of the signal.

Figure 8:
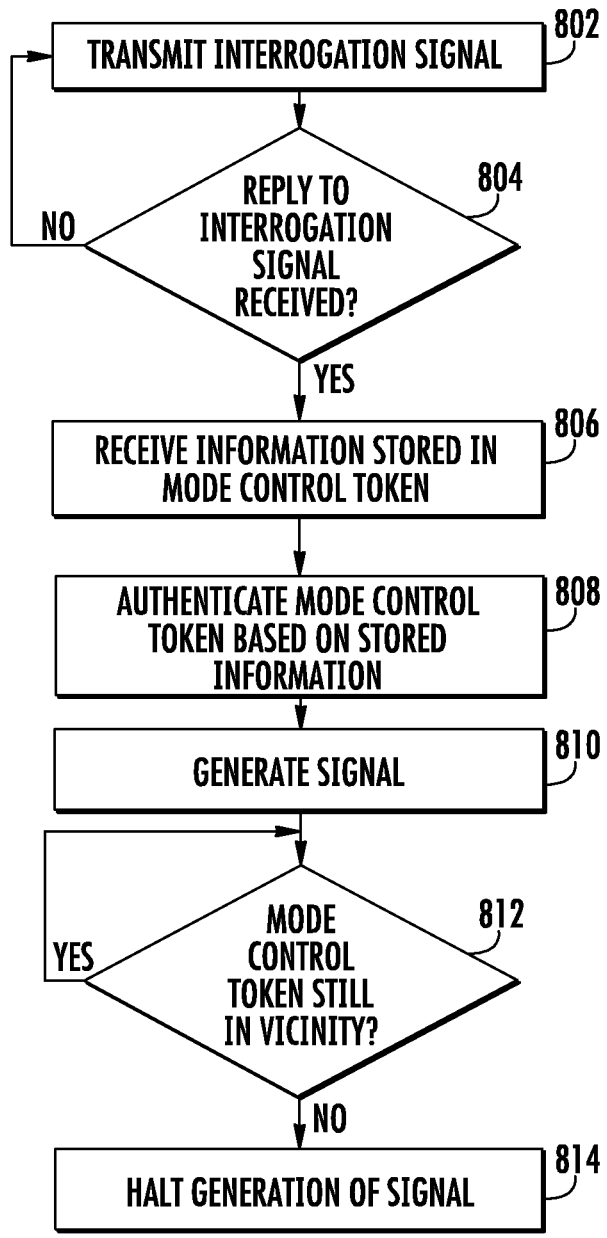
FIG. 8 illustrates a flowchart of a method for operating the material handling system, in accordance with one or more embodiments of the present disclosure.
Figure 9:
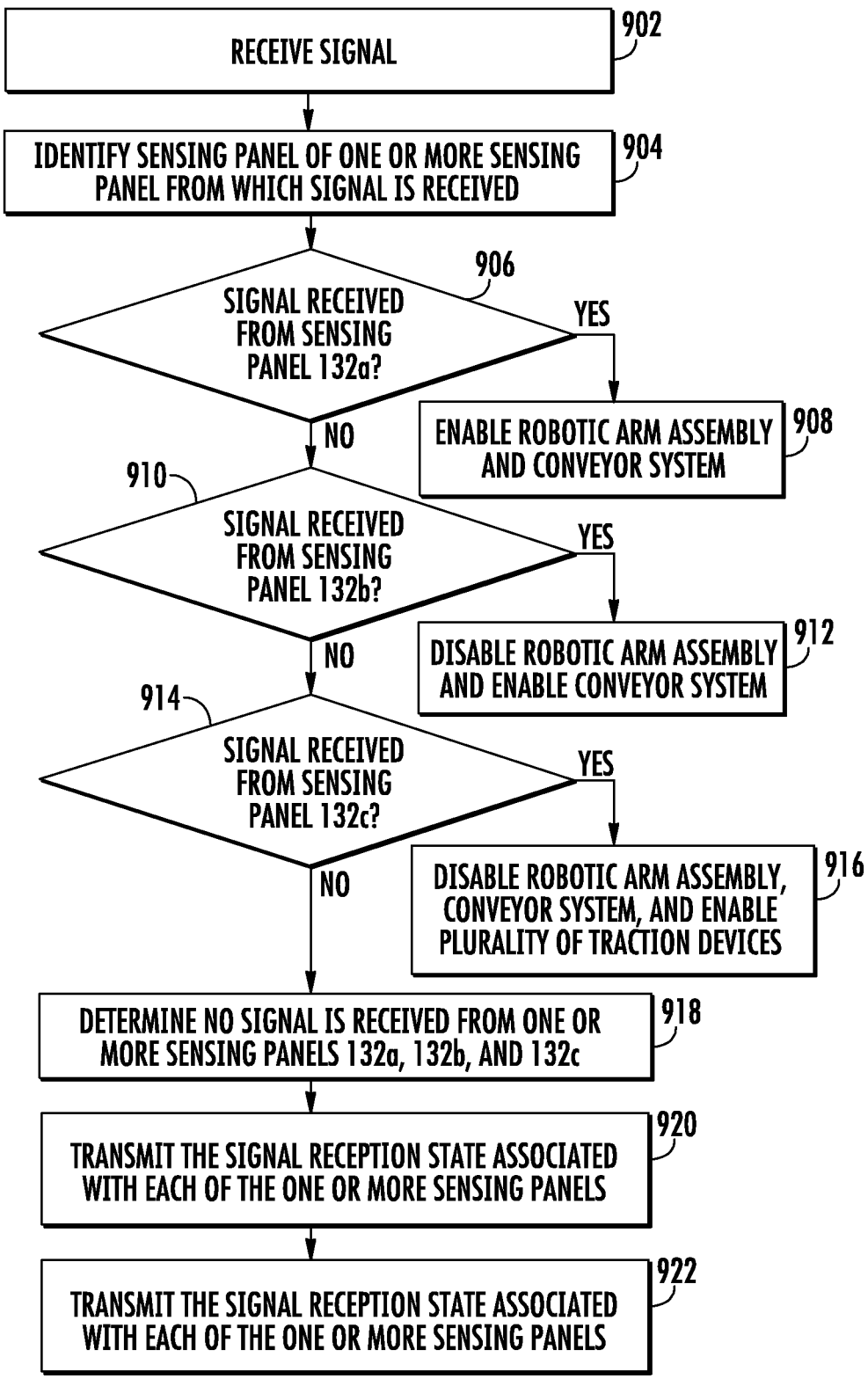
FIG. 9 illustrates a flowchart of another method for operating the material handling system, in accordance with one or more embodiments of the present disclosure.

FIGS. 8 and 9 illustrate example flowcharts and example methods of the operations performed by an system, such as the material handling system 100 having control unit 130 of FIG. 1 in accordance with example embodiments of the present disclosure. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 8 and 9, when executed, convert a computer or processing circuitry into a particular machine configured to perform an example embodiment of the present invention. Accordingly, the operations of FIGS. 8 and 9 may define an algorithm for configuring a computer or processor, to perform an example embodiment. In some cases, a general purpose computer may be provided with an instance of the processor which performs the algorithm of FIGS. 8 and 9, to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts', and combinations of blocks in the flowchart, can be implemented by special purpose hardware-based computer systems which perform the specified functions, or combinations of special purpose hardware and computer instructions.

FIG. 8 illustrates a flowchart 800 of a method for operating the material handling system 100, in accordance with one or more embodiments.

At step 802, the sensing panel 132 includes means such as, the RF reader 304, for transmitting the interrogation signal. At block 804, the sensing panel 132 includes means such as, the RF reader 304, for determining whether a reply to the interrogation signal is received. If at block 804, it is determined by the RF reader 304 that the reply to the interrogation signal is received, the block 806 is performed. However, if the RF reader 304 determines that the reply to the interrogation signal is not received, the RF reader 304 may determine that the mode control token 134 is not within the vicinity of the sensing panel 132. Further, the RF reader 304 repeats the processing of the block 802.

At block 806, the sensing panel 132 includes means such as, the RF reader 304, for retrieving the information stored in the mode control token 134 by initiating the interrogation sequence in accordance with one or more known protocols such as RFID communication protocol, Bluetooth communication protocol, and/or the like. In an example embodiment, the information may include at least the unique ID of the mode control token 134. At block 808, the sensing panel 132 includes means such as, the RF reader 304, for transmitting the unique ID to the sensing unit 208 in the control unit 130. In an example embodiment, the sensor unit 208 may be configured to authenticate the mode control token 134 by comparing the unique ID received from the mode control token 134 with the set of predetermined IDs stored in a memory device 204, as is described supra in conjunction with FIG. 2.

In an alternate embodiment, the RF reader 304 may be itself configured to authenticate the mode control token 134. In such an embodiment, the RF reader 304 may be configured to compare the unique ID with the set of predetermined IDs stored in the memory of the RF reader 304.

At block 810, the sensing panel 132 includes means such as, the RF reader 304, for generating the signal based on the authentication of the mode control token 134. For example, if the mode control token 134 is successfully authenticated, the RF reader 304 is adapted to generate the signal. However, if the authentication of the mode control token 134 is unsuccessful, the RF reader 304 may not generate the signal. Further, the RF reader 304 is adapted to transmit the signal to the sensor unit 208.

At block 812, the sensing panel 132 includes means such as, the RF reader 304, for determining whether the mode control token 134 remains within the vicinity of the RF reader 304. As discussed, the RF reader 304 may periodically interrogate the mode control token 134 to determine whether the mode control token 134 is within the vicinity of the RF reader 304. If at block 812, the RF reader 304 determines that the mode control token 134 is not within (e.g., outside) the vicinity of the RF reader 304, the RF reader 304, at block 814, halts the generation of the signal. However, if at block 812, the RF reader 304 determines that the mode control token 134 is within the vicinity of the RF reader 304, the RF reader 304 repeats the processing of the block 812.

FIG. 9 illustrates a flowchart 900 of another method for operating the material handling system 100, in accordance with the one or more embodiments of the present disclosure.

At block 902, the control unit 130 includes means such as, the sensor unit 208, the processor 202, and/or the like, for receiving the signal from the one or more sensing panels 132a, 132b, and 132c. At block 904, the control unit 130 includes means such as, the sensor unit 208, the processor 202, and/or the like, for identifying a sensing panel of the one or more sensing panels 132a, 132b, and 132c that has transmitted the signal. As discussed above, the one or more sensing panels 132a, 132b, and 132c are communicatively coupled to the sensor unit 208 on different ports. Based on the determining the port on which the signal is received, the sensor unit 208 may be able to identify the sensing panel of the one or more sensing panels 132a, 132b, and 132c.

At block 906, the control unit 130 includes means such as, the sensor unit 208, the processor 202, and/or the like, for determining whether the signal is received from the sensing panel 132a. If at block 906, the sensor unit 208 determines that the signal is received from the sensing panel 132a, the sensor unit 208 is adapted to transmit the signal reception state associated with each of the one or more sensing panels 132a, 132b, and 132c to the mode control unit 210. At block 908, the control unit 130 includes means such as, the mode control unit 210, the processor 202, and/or the like, for enabling the robotic arm assembly 104 and the conveyor system 106, thereby enabling the material handling system 100 in the automatic mode. As discussed above, to operate the material handling system 100 in the automatic mode, the mode control unit 210 may be configured to transmit the instruction to the robotic arm interface unit 212 and the conveyor interface unit 214 to enable the robotic arm assembly 104 and the conveyor system 106. However, if the sensor unit 208 determines that the signal is not received from the sensing panel 132a, the block 910 is processed.

At block 910, the control unit 130 includes means such as, the sensor unit 208, the processor 202, and/or the like, for determining whether the signal is received from the sensing panel 132b. If at block 910, the sensor unit 208 determines that the signal is received from the sensing panel 132b, the sensor unit 208 is adapted to transmit the signal reception state associated with each of the one or more sensing panels 132a, 132b, and 132c to the mode control unit 210. At block 912, the control unit 130 includes means such as, the mode control unit 210, the processor 202, and/or the like, for disabling the robotic arm assembly 104 and enabling the conveyor system 106, thereby enabling the material handling system 100 in the conveyor mode. However, if the sensor unit 208 determines that the signal is not received from the sensing panel 132b, the block 914 is processed.

At block 914, the control unit 130 includes means such as, the sensor unit 208, the processor 202, and/or the like, for determining whether the signal is received from the sensing panel 132c. If at block 914, the sensor unit 208 determines that the signal is received from the sensing panel 132c, the sensor unit 208 is adapted to transmit the signal reception state associated with each of the one or more sensing panels 132a, 132b, and 132c, to the mode control unit 210. At block 916, the control unit 130 includes means such as, the mode control unit 210, the processor 202, and/or the like, for disabling the robotic arm assembly 104 and the conveyor system 106. Further, the mode control unit 210 is adapted to enable the plurality of traction devices 108, thereby enabling the material handling system 100 in the traversal mode. However, if the sensor unit 208 determines that the signal is not received from the sensing panel 132c, the block 918 is processed.

At block 918, the control unit 130 includes means such as, the sensor unit 208, the processor 202, and/or the like, for determining that the signal is not received from any of the one or more sensing panels 132a, 132b, and 132c. Accordingly, at block 920, the control unit 130 includes means such as, the sensor unit 208, the processor 202, and/or the like, for transmitting the signal reception state associated with each of the one or more sensing panels 132a, 132b, and 132c to the mode control unit 210. The mode control unit 210 on determining that the signal is not being received from any of the one or more sensing panels 132a, 132b, and 132c. At block 922, the control unit 130 includes means such as, the mode control unit 210, the processor 202, and/or the like, for disabling each of the robotic arm assembly 104, the conveyor system 106, and the plurality of traction devices 108.

Figure 10:
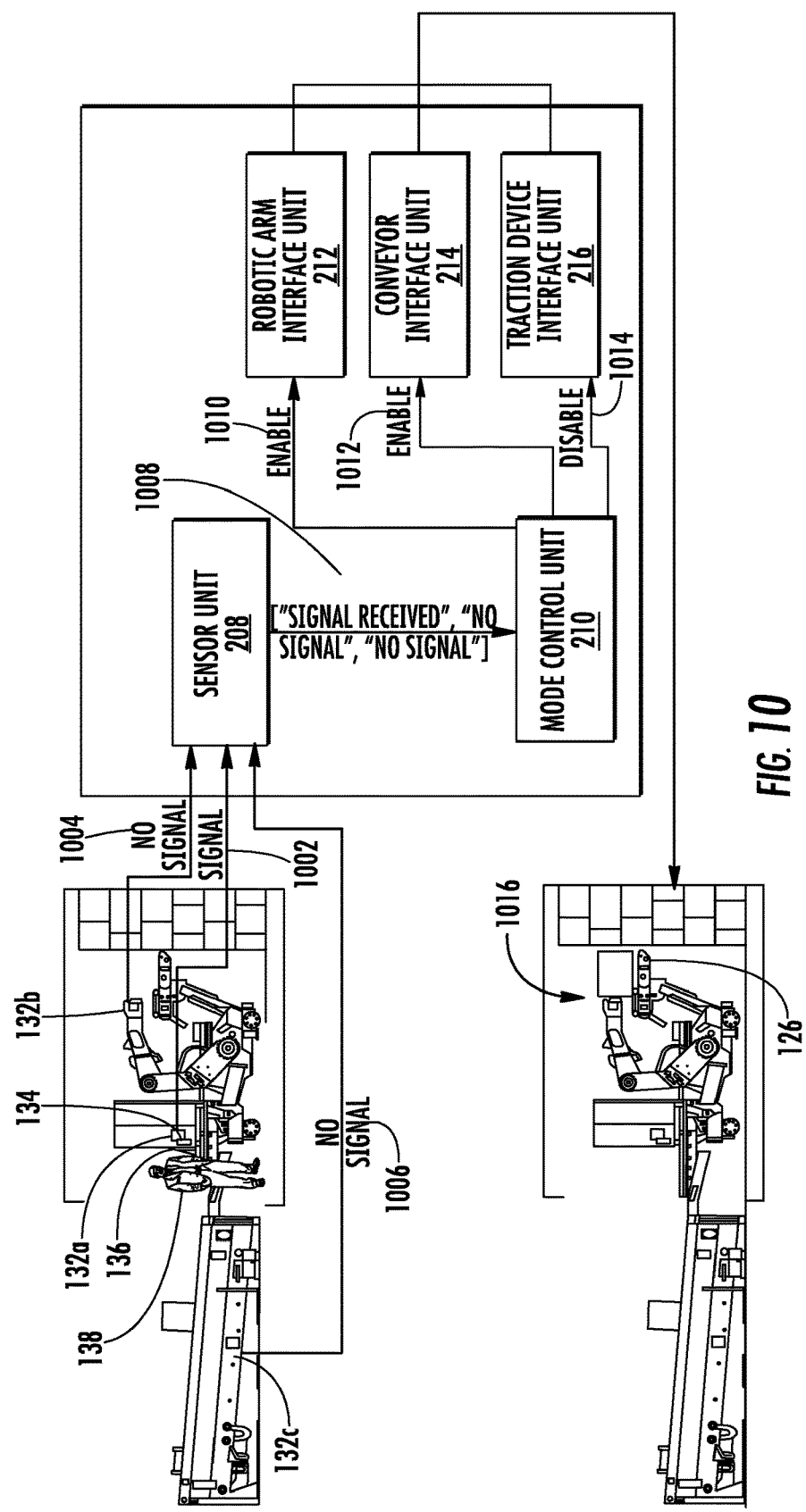
FIG. 10 illustrates an example material handling system operating in an automatic mode, in accordance with one or more embodiments of the present disclosure.

FIG. 10 illustrates an example material handling system 100 operating in the automatic mode, in accordance with the one or more embodiments of the present disclosure.

If the operator of the material handling system 100 wishes to operate the material handling system 100 in the automatic mode, the operator may bring the mode control token 134 within the vicinity of the sensing panel 132a positioned on the operator control panel 136.

When the mode control token 134 is within the vicinity of the sensing panel 132a, the sensing panel 132a generates the signal (depicted by 1002), while the sensing panels 132b and 132c do not generate any signal (depicted by 1004 and 1006, respectively). The signal 1002 generated by the sensing panel 132a is transmitted to the sensor unit 208. On receiving the signal, the sensor unit 208 is adapted to transmit the signal reception state for each of the one or more sensing panels 132a, 132b, and 132c to the mode control unit 210. As depicted in FIG. 10, the sensor unit 208 transmits information as a vector ["signal received", "no signal", "no signal"] (depicted by 1008) to the mode control unit 210.

In an example embodiment, the first parameter of the vector 1008 depicts the signal reception state for the sensing panel 132a. Further, the second parameter and the third parameter of the vector 1008 depicts the signal reception state for the sensing panels 132b and 132c, respectively.

After receiving the information, the mode control unit 210 utilizes the look-up table illustrated in table 1 to determine the mode of operation of the material handling system 100. In an example embodiment, the mode control unit 210 is adapted to compare the received vector with the entries in the look-up table illustrated in table 1. Based on the comparison, the mode control unit 210 determines that the mode corresponds to the automatic mode.

Thereafter, the mode control unit 210 is adapted to determine which of the robotic arm assembly 104, the conveyor system 106, and the plurality of traction devices 108 are to be enabled or disabled. In an example embodiment, the mode control unit 210 utilizes the look-up table illustrated in table 2 to determine that in the automatic mode, the conveyor system 106 and the robotic arm are enabled, while the plurality of traction devices 108 are disabled.

Accordingly, the mode control unit 210 is adapted to transmit the one or more instructions to the robotic arm interface unit 212, the conveyor system interface unit 214, and the traction member interface unit 214. From FIG. 10, it can be observed that the mode control unit 210 transmits enable instruction to the robotic arm interface unit 212, and the conveyor system interface unit 214 (depicted by 1010 and 1012, respectively). Further, the mode control unit 210 is adapted to transmit the disable instruction to the traction interface unit 216 (depicted by 1014).

In the automatic mode, the robotic arm assembly 104 is adapted to retrieve the carton from the carton pile 120 and place the retrieved carton on the conveyor system 106 (depicted by 1016). More particularly, the robotic arm 104 places the retrieved carton on the lift 126. The carton is thereafter conveyed from the lift 126 to the end 122 of the material handling system 100 by the conveyor system. Further, in the automatic mode, the lift 126 traverses in accordance to the traversal of the robotic arm assembly 104. For example, if the robotic arm assembly 104 moves in an upward direction to retrieve the carton, the lift 126 also moves in the upward direction in accordance with the movement of the robotic arm assembly 104.

In certain scenarios, if the operator observed that the robotic arm assembly 104 is malfunctioning, operator may simply pull the mode control token 134 away from the sensing panel 132a. Such a scenario has been discussed in conjunction with FIG. 11.

Figure 11:
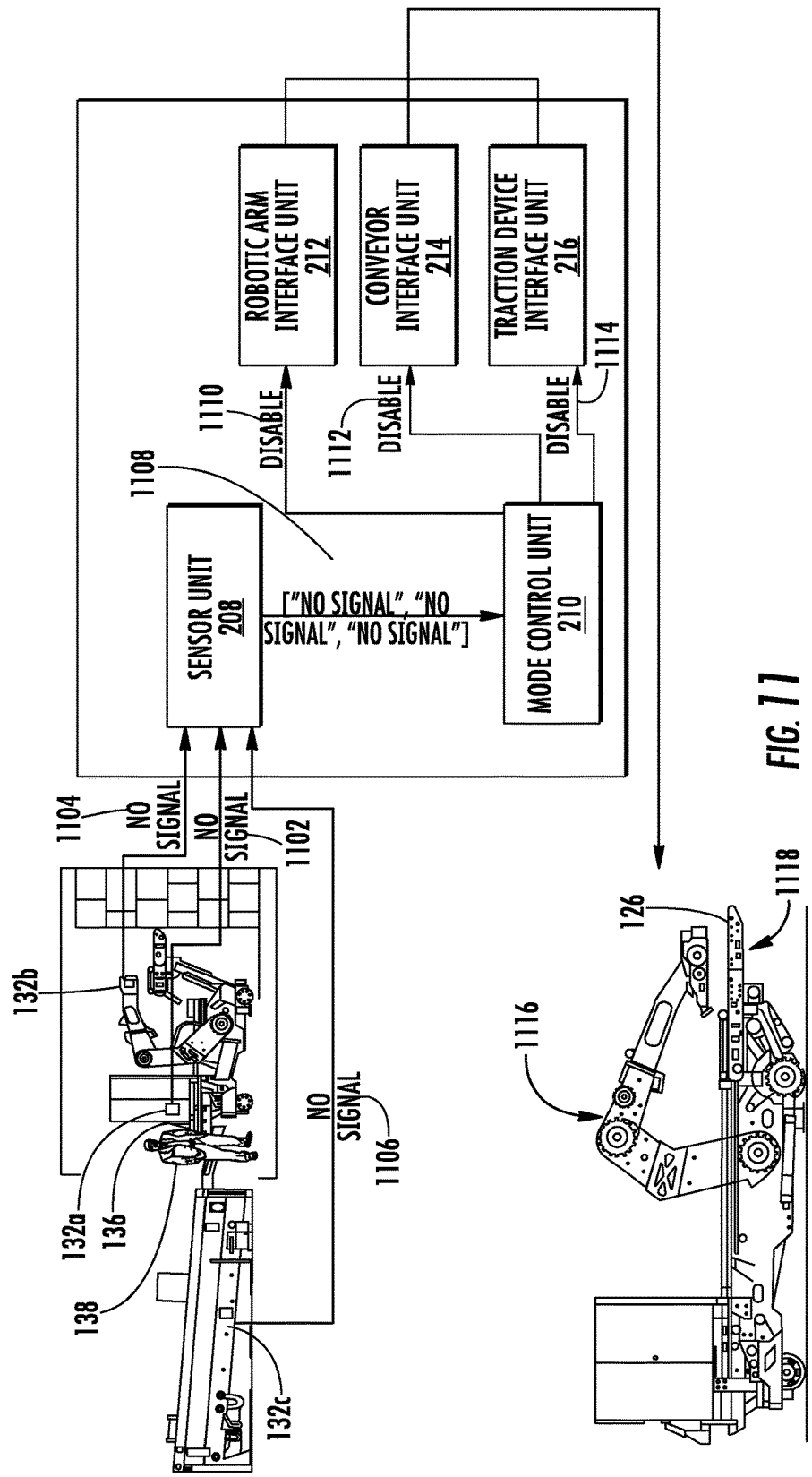
FIG. 11 illustrates an example material handling system operating in a stop mode, in accordance with one or more embodiments of the present disclosure.

FIG. 11 illustrates an example material handling system 100 operating in a stop mode, in accordance with the one or more embodiments.

It can be observed that the mode control token 134 is not within the vicinity of any of the one or more sensing panels 132a, 132b, and 132c. Therefore, each of the one or more sensing panels 132a, 132b, and 132c will not transmit the signal to the sensor unit 208 (depicted by 1102, 1104, and 1106, respectively). Further, the sensor unit 208 is adapted to determine such change in the signal reception state for each of the one or more sensing panel 132a, 132b, and 132c.

As the signal reception state associated with each of the one or more sensing panels 132a, 132b, and 132c is "no signal", therefore, sensing panel 208 transmits a vector ["no signal", "no signal", "no signal"] to the mode control unit 210 (depicted by 1108). The mode control unit 210 is adapted to compare the received vector with entries of the look-up table illustrated in table 1 to determine the mode of operation of the material handling system 100. From the table 1 it can be observed that for vector ["no signal", "no signal", "no signal"] the stop mode is selected.

Thereafter, the mode control unit 210 utilizes the look-up table illustrated in table 2 to determine that, in the stop mode, the conveyor system 106, the plurality of traction devices 108, and the robotic arm are disabled. Accordingly, the mode control unit 210 is adapted to transmit the one or more instructions to the robotic arm interface unit 212, the conveyor system interface unit 214, and the traction member interface unit 214. From FIG. 11, it can be observed that the mode control unit 210 transmits disable instruction to the robotic arm interface unit 212, traction interface unit 216, and the conveyor system interface unit 214 (depicted by 1110, 1112, and 1114, respectively).

When the robotic arm interface unit 212 disables the robotic arm assembly 104, the robotic arm assembly 104 may not immediately halts. In an example embodiment, the robotic arm interface unit 212 may instruct the robotic arm assembly 104 to traverse to a default position or home position. Thereafter, the robotic arm assembly 104 is brought to halt. The robotic arm assembly 104 in the default position is depicted by 1116.

On similar lines, conveyor system 106 is also not brought to an immediate stand still. In an example embodiment, the lift 126 of the conveyor system 106 is retracted to a position where a longitudinal axis of the lift 126 aligns with a longitudinal axis of the plurality of fixed conveyors 124. Therefore, the lift 126 is leveled with the plurality of fixed conveyors 124 prior to bringing the conveyor system 106 to stand still or halt (depicted by 1118).

In an alternate embodiment, the robotic arm interface unit 212 may immediately halt the operation of the robotic arm assembly 104 on receiving the disable instruction from the mode control unit 210. Similarly, the conveyor interface unit 214 may immediately halt the operation of the conveyor system 106 on receiving the disable instruction from the mode control unit 210

In certain scenarios, the operator of the material handling system 100 may want to operate the machine in the conveyor mode, where the cartons are manually retrieved by the operator from the carton pile 120 and conveyor system 106 is utilized to transport the retrieved carton to the end of the material handling system 100. Configuring the material handling system 100 in the conveyor mode has been described in conjunction with FIG. 12.

Figure 12:
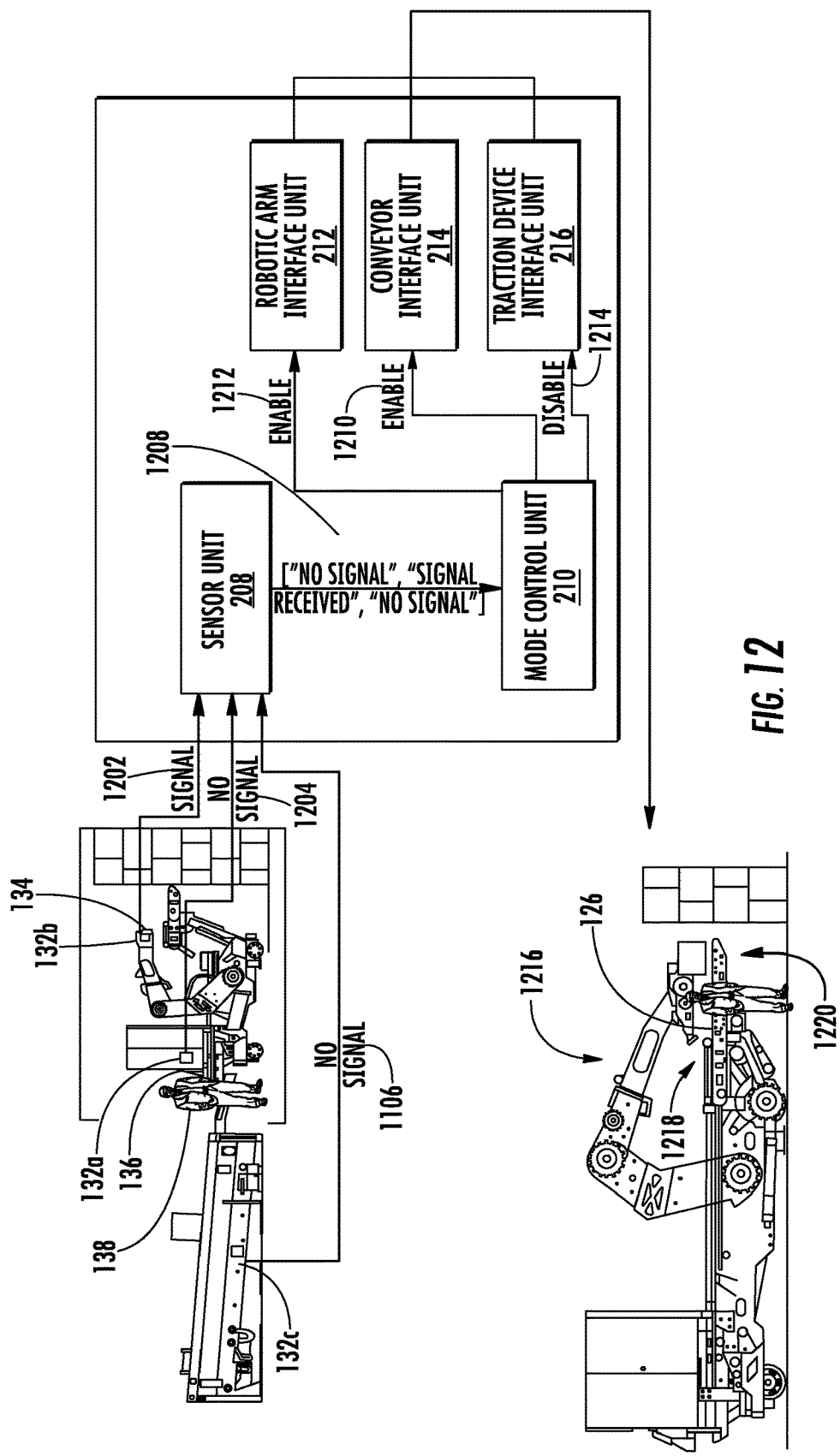
FIG. 12 illustrates an example material handling system operating in a conveyor mode, in accordance with one or more embodiments of the present disclosure.

FIG. 12 illustrates an example material handling system 100 operating in the conveyor mode, in accordance with the one or more embodiments of the present disclosure.

To operate the material handling system 100 in the conveyor mode, the operator may place the mode control token 134 within the vicinity of the sensing panel 132b positioned in the manipulator 118 of the robotic arm assembly 104.

When the mode control token 134 is within the vicinity of the sensing panel 132b, the sensing panel 132b generates the signal (depicted by 1202), while the sensing panels 132a and 132c do not generate any signal (depicted by 1204 and 1206, respectively). The signal generated by the sensing panel 132b is transmitted to the sensor unit 208. On receiving the signal, the sensor unit 208 is adapted to transmit the signal reception state for each of the one or more sensing panels 132a, 132b, and 132c to the mode control unit 210. As depicted in FIG. 12, the sensor unit 208 transmits signal reception state as a vector ["no signal", "signal received", "no signal"] (depicted by 1208) to the mode control unit 210.

In an example embodiment, the first parameter of the vector 1008 depicts the signal reception state of the sensing panel 132a. Further, the second parameter and the third parameter of the vector 1008 depicts the signal reception state for the sensing panel 132b and 132c, respectively.

After the reception of the signal reception state, the mode control unit 210 utilizes the look-up table illustrated in table 1 to determine the mode of operation of the material handling system 100. In an example embodiment, the mode control unit 210 is adapted to compare the received vector with the entries in the look-up table illustrated in table 2. Based on the comparison, the mode control unit 210 determines that the mode of operation corresponds to the conveyor mode.

Thereafter, the mode control unit 210 is adapted to determine which of the robotic arm assembly 104, the conveyor system 106, and the plurality of traction devices 108 are to be enabled or disabled. In an example embodiment, the mode control unit 210 utilizes the look-up table illustrated in table 2 to determine that in the conveyor mode, the conveyor system 106 is enabled, while the robotic arm assembly 104 and the plurality of traction devices 108 are disabled.

Accordingly, the mode control unit 210 is adapted to transmit the one or more instructions to the robotic arm interface unit 212, the conveyor system interface unit 214, and the traction member interface unit 214. From FIG. 12, it can be observed that the mode control unit 210 transmits enable instruction to the conveyor system interface unit 214 (depicted by 1210). Further, the mode control unit 210 transmits the disable instruction to the robotic arm assembly 104 and the traction interface unit 216 (depicted by 1212, and 1214, respectively).

In the conveyor mode, the lift 126 of the conveyor system 106 is retracted to a position where a longitudinal axis of the lift 126 aligns with a longitudinal axis of the plurality of fixed conveyors 124. Therefore, the lift 126 is levelled with the plurality of fixed conveyors 124 (depicted by 1218). The operator may retrieve the carton from the carton pile 120 and place it on the conveyor system 106. Thereafter, the conveyor system 106 may convey the carton to the end 122 of the material handling system 100 (depicted by 1220).

Figure 13:
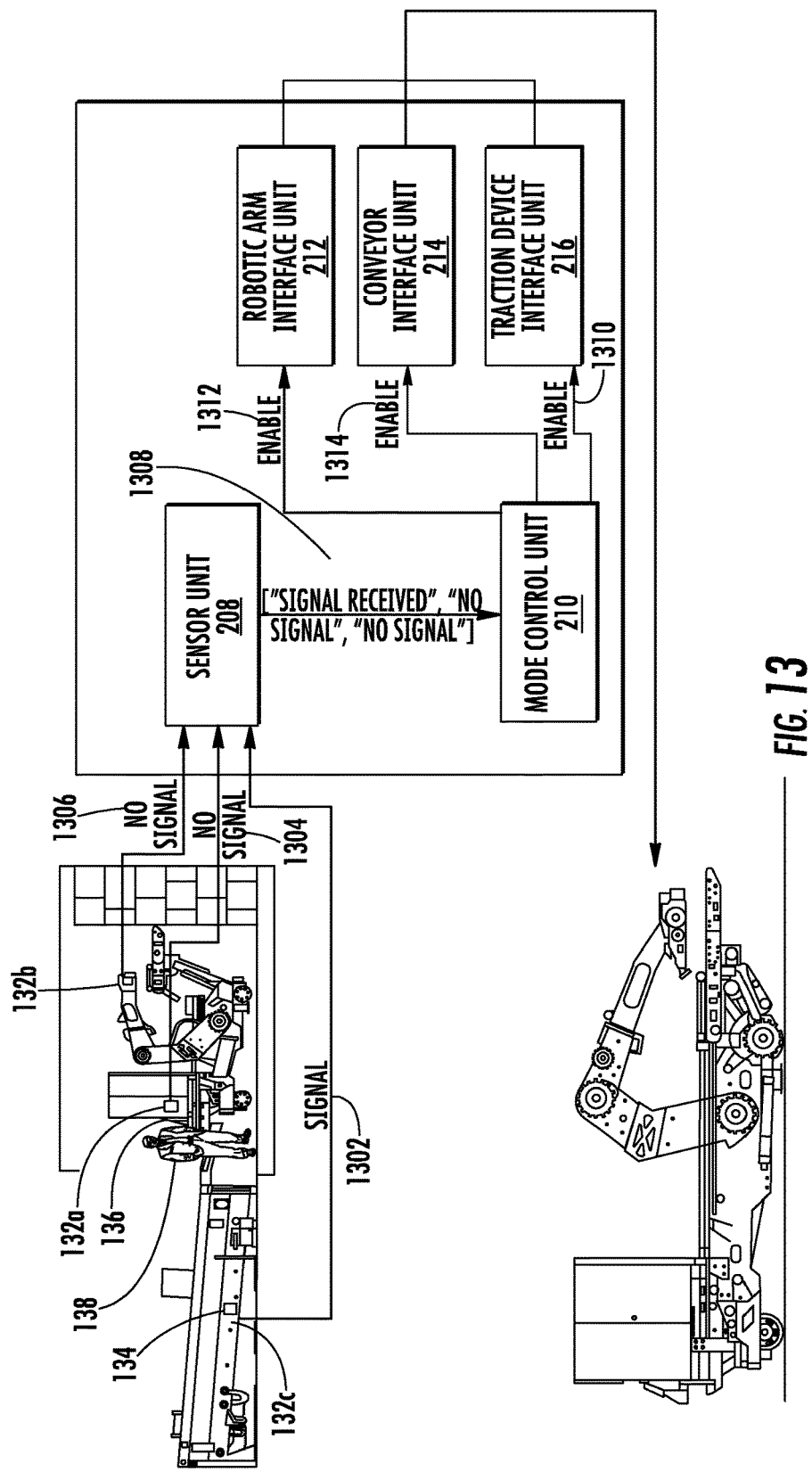
FIG. 13 illustrates an example material handling system operating in a traversal mode, in accordance with one or more embodiments of the present disclosure.

FIG. 13 illustrates another example material handling system 100 operating in a traversal mode, in accordance with the one or more embodiments of the present disclosure.

To operate the material handling system 100 in the traversal mode, the operator may place the mode control token 134 within the vicinity of the sensing panel 132c positioned below the conveyor system 106.

When the mode control token 134 is within the vicinity of the sensing panel 132c, the sensing panel 132c generates the signal (depicted by 1302), while the sensing panels 132a and 132b do not generate any signal (depicted by 1304 and 1306, respectively). The signal generated by the sensing panel 132c is transmitted to the sensor unit 208. On receiving the signal, the sensor unit 208 is adapted to transmit the signal reception state for each of the one or more sensing panels 132a, 132b, and 132c to the mode control unit 210. As depicted in the FIG. 13, the sensor unit 208 transmits signal reception state as a vector ["no signal", "no signal", "signal received"] (depicted by 1308) to the mode control unit 210.

After the reception of the signal reception state, the mode control unit 210 utilizes the look-up table illustrated in table 1 to determine the mode of operation of the material handling system 100. In an example embodiment, the mode control unit 210 is adapted to compare the received vector with the entries in the look-up table illustrated in table 2. Based on the comparison, the mode control unit 210 determines that the mode corresponds to the traversal mode.

Thereafter, the mode control unit 210 is adapted to determine which of the robotic arm assembly 104, the conveyor system 106, and the plurality of traction devices 108 are to be enabled or disabled. In an example embodiment, the mode control unit 210 utilizes the look-up table illustrated in table 2 to determine that in traversal mode, the plurality of traction devices 108 is enabled, while the robotic arm assembly 104 and the conveyor system 106 are disabled.

Accordingly, the mode control unit 210 is adapted to transmit the one or more instructions to the robotic arm interface unit 212, the conveyor system interface unit 214, and the traction member interface unit 214. From flow diagram 1200, it can be observed that the mode control unit 210 transmits enable instruction to the traction member interface unit 214 (depicted by 1310). Further, the mode control unit 210 is adapted to transmit the disable instruction to the robotic arm assembly 104 and the conveyor system 106 (depicted by 1312, and 1314, respectively).

In the traversal mode, the plurality of traction devices 108 are enabled and powered to allow traversal of the material handling system 100.

The disclosed embodiments encompass numerous advantages. The use of the mode control token 134 allows the operator to configure the material handling system 100 in the one or more modes seamlessly. In order to configure the material handling system 100, the operator has to bring the mode control token within the vicinity of the one of the one or more sensing panels 132a, 132b, and 132c. Further, the disclosed embodiments, allow the operator to immediately shut down or halt the operation of the material handling system 100 by removing the mode control token 134 out of the vicinity of the one or more sensing panels 132a, 132b, and 132c. The disclosed embodiments also allow the authentication of the mode control token 134 prior to configuring the material handling system 100 in the one or more modes.

Such authentication process allows only specific mode control tokens to be used with the material handling system 100, therefore, prevents the use of non-authentic mode control tokens. Such authentication process reduces the misuse of the material handling system 100.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods may be performed by circuitry that is specific to a given function.

In one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor-readable media. These instructions may be embodied by one or more processor-executable software modules that reside on the one or more non-transitory computer-readable or processor-readable storage media. Non-transitory computer-readable or processor-readable storage media may in this regard comprise any storage media that may be accessed by a computer or a processor. By way of example but not limitation, such non-transitory computer-readable or processor-readable media may include RAM, ROM, EEPROM, FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media may be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

The invention claimed is:

1. A material handling system comprising:
one or more sub-systems for facilitating a movement of materials;
one or more sensing panels communicably coupled to the one or more of the sub-systems;
a sensor unit communicably coupled to the one or more sensing panels, wherein the sensor unit is adapted to receive a signal from the one or more sensing panels indicative of a signal reception state of each of the sensing panels, wherein the signal reception state indicates whether or not a mode control token is within a vicinity of the one or more sensing panels; and
a control unit configured to receive the signal reception state from the sensor unit, wherein the control unit is adapted to:
determine a mode of operation from among a plurality of modes for operating the one or more sub-systems; and
enable or disable the one or more sub-systems in response to determining the mode of operation.

2. The material handling system as claimed in claim 1, wherein the signal reception state comprises:
a no signal state, wherein the no signal state indicates that a signal is not received by the sensor unit from the one or more sensing panels, and
a signal received state, wherein the signal received state indicates that a signal is received by the sensor unit from the one or more sensing panels.

3. The material handling system as claimed in claim 1, wherein the modes of operation comprise one of an automatic mode, a conveyor mode, a traversal mode, or a stop mode.

4. The material handling system as claimed in claim 1, wherein the one or more sub-systems comprise one or more of a robotic arm assembly, a conveyor system, and a plurality of traction devices.

5. The material handling system as claimed in claim 3, wherein in the automatic mode, the robotic arm assembly and the conveyor system are enabled, wherein in the conveyor mode, the conveyor system is enabled, wherein in the traversal mode, the plurality of traction devices are enabled, and wherein in the stop mode, the robotic arm assembly, the conveyor system, and the plurality of traction devices are disabled.

6. The material handling system as claimed in claim 1, wherein the one or more sensing panels are further configured to:
determine whether the mode control token is within a vicinity of a respective sensing panel of the one or more sensing panels;
generate the signal when the mode control token is determined to be within the vicinity of the respective sensing panel; and
halt generation of the signal when the mode control token is determined to be outside of the vicinity of the respective sensing panel.

7. The material handling system as claimed in claim 1, further comprising a switching element configured to enable or disable the one or more sub-systems, wherein the switching element is one of a relay, a driver circuit, or a dual channel circuit breaker.

8. The material handling system as claimed in claim 1, wherein the one or more sensing panels are configured to initiate an interrogation sequence with the mode control token to retrieve the information stored in the mode control token, wherein the information stored is a unique ID that identifies one of the mode control tokens authorized to access the one or more sub-systems or an operator authorized to operate the one or more sub-systems.

9. A material handling system comprising:
one or more sub-systems for facilitating a movement of materials;
a plurality of mode control tokens, wherein each mode control token comprises information pertaining to a particular mode of operation from among a plurality of modes;
one or more sensing panels communicably coupled to the one or more of the sub-systems configured to:
determine whether a mode control token from among the plurality of mode control tokens is within a vicinity of a respective sensing panel of the one or more sensing panels; and
generate a signal indicative of the particular mode of operation associated with the mode control token when the mode control token is determined to be within the vicinity of the respective sensing panel; and
a control unit configured to operate the one or more sub-systems based on the particular mode of operation associated with the mode control token.

10. The material handling system as claimed in claim 9, wherein the control unit comprises a mode control unit and a processor for enabling or disabling the one or more sub-systems based on the particular mode of operation.

11. The material handling system as claimed in claim 9, wherein the mode control token comprises a front panel, a back panel, and an insert, and wherein the front panel comprises a cavity to receive a wireless tag and a recess to receive a magnet.

12. The material handling system as claimed in claim 9, wherein one or more sensing panels are further configured to halt generation of the signal when the mode control token is determined to be outside the vicinity of the respective sensing panel.

13. The material handling system as claimed in claim 8, further comprising a sensor unit communicably coupled to the one or more sensing panels and adapted to receive the signal and transmit a signal reception state to the control unit based on the received signal.

14. A method for operating a material handling system, the method comprising:
receiving, by a sensor unit, a signal from one or more sensing panels indicative of a signal reception state of each of a plurality of sensing panels, wherein the signal reception state indicates whether or not a mode control token is within a vicinity of the one or more sensing panels;

receiving, by a control unit, the signal reception state from the sensor unit;

determining, by the control unit, a mode of operation from among a plurality of modes for operating one or more sub-systems based on the signal reception state; and enabling or disabling, by the control unit, the one or more sub-systems in response to determining the mode of operation.

15. The method as claimed in claim 14, further comprising initiating an interrogation sequence with the mode control token to retrieve the information stored in the mode control token, wherein the information stored is a unique ID that identifies one of the mode control tokens authorized to access the one or more sub-systems or an operator authorized to operate the one or more sub-systems.

16. The method as claimed in claim 14, further comprising:

determining whether the mode control token is within a vicinity of a respective sensing panel of the one or more sensing panels;

generating the signal in an instance in which the mode control token is determined to be within the vicinity of the respective sensing panel; and halting the generation of the signal in an instance in which the mode control token is determined to be outside of the vicinity of the respective sensing panel.

\* \* \* \* \*